US012116170B2

(12) United States Patent
Smith

(10) Patent No.: US 12,116,170 B2
(45) Date of Patent: Oct. 15, 2024

(54) FOLDABLE CASSETTE BAGS FOR TRANSPORTING BIOMATERIALS

(71) Applicant: Cryoport, Inc., Brentwood, TN (US)

(72) Inventor: Steffen Smith, View Park, CA (US)

(73) Assignee: Cryoport, Inc., Brentwood, TN (US)

( * ) Notice: Subject to any disclaimer, the term of this patent is extended or adjusted under 35 U.S.C. 154(b) by 0 days.

(21) Appl. No.: 18/217,289

(22) Filed: Jun. 30, 2023

(65) Prior Publication Data

US 2023/0339653 A1 Oct. 26, 2023

Related U.S. Application Data

(63) Continuation of application No. 17/580,044, filed on Jan. 20, 2022, now Pat. No. 11,691,788.

(51) Int. Cl.

| | |
|---|---|
| ***B65D 27/14*** | (2006.01) |
| ***A61J 1/16*** | (2023.01) |
| ***B65B 5/02*** | (2006.01) |
| ***B65B 5/04*** | (2006.01) |
| ***B65D 25/28*** | (2006.01) |
| ***B65D 81/05*** | (2006.01) |
| ***B65D 81/26*** | (2006.01) |

(52) U.S. Cl.

CPC ................ *B65D 27/14* (2013.01); *A61J 1/16* (2013.01); *B65B 5/024* (2013.01); *B65B 5/04* (2013.01); *B65D 25/2894* (2013.01); *B65D 81/05* (2013.01); *B65D 81/264* (2013.01)

(58) Field of Classification Search

CPC .... B65D 27/14; B65D 25/2894; B65D 81/05; B65D 81/264; A61J 1/16; B65B 5/024; B65B 5/04

USPC ......................................... 206/521, 594, 438

See application file for complete search history.

(56) References Cited

U.S. PATENT DOCUMENTS

| | | | |
|---|---|---|---|
| 1,719,347 | A | 7/1929 | Weinstein |
| 3,717,005 | A | 2/1973 | McGrew et al. |
| 3,948,409 | A | 4/1976 | Ovchinnikov et al. |
| 3,955,749 | A | 5/1976 | Turkenkopf |
| 4,306,425 | A | 12/1981 | Sitte et al. |
| 4,313,558 | A | 2/1982 | Benham |
| 4,411,138 | A | 10/1983 | Leithauser et al. |
| 4,455,842 | A | 6/1984 | Granlund |

(Continued)

FOREIGN PATENT DOCUMENTS

| | | | |
|---|---|---|---|
| CN | 2412849 | Y | 1/2001 |
| CN | 207943335 | U | 10/2018 |

(Continued)

OTHER PUBLICATIONS

KIPO; International Search Report and Written Opinion dated May 2, 2023 in PCT Application No. PCT/US2023/010113.

(Continued)

*Primary Examiner* — Jacob K Ackun

(74) *Attorney, Agent, or Firm* — Snell & Wilmer L.L.P.

(57) ABSTRACT

An envelope is configured to hold, support, and protect an article such as a blood bag during transportation under cryogenic temperatures. The envelope includes a single piece component (e.g., a monolithic component), including multiple panels that are configured to fold to form an enclosure that surrounds the article such as the blood bag for support and protection of the article such as the blood bag.

20 Claims, 18 Drawing Sheets

(56) References Cited

U.S. PATENT DOCUMENTS

| | | | | |
|---|---|---|---|---|
| 4,542,826 | A | 9/1985 | Adams | |
| 4,572,363 | A | 2/1986 | Alpern | |
| 4,694,655 | A | 9/1987 | Seidel et al. | |
| 4,729,494 | A | 3/1988 | Peillon et al. | |
| 4,790,141 | A | 12/1988 | Glascock | |
| 5,566,821 | A | 10/1996 | Brown et al. | |
| 5,954,202 | A | 9/1999 | Mellon | |
| 6,206,194 | B1 | 3/2001 | Beneroff et al. | |
| 6,467,642 | B2 | 10/2002 | Mullens et al. | |
| 6,539,360 | B1 | 3/2003 | Kadaba | |
| 6,913,389 | B2 | 7/2005 | Kannankeril | |
| 7,627,926 | B2 | 12/2009 | Williams | |
| 7,881,987 | B1 | 2/2011 | Hart | |
| 8,220,107 | B2 | 7/2012 | Williams | |
| 8,371,449 | B2 | 2/2013 | Simon et al. | |
| 8,397,343 | B2 | 3/2013 | Williams | |
| 8,904,180 | B2 | 12/2014 | Schabron et al. | |
| 9,292,824 | B1 | 3/2016 | Freeman | |
| 9,378,442 | B2 | 6/2016 | Barnings | |
| 10,987,276 | B2 | 4/2021 | Mongrenier | |
| 11,124,354 | B2 | 9/2021 | Waltermire | |
| 11,691,788 | B1 * | 7/2023 | Smith | B65B 5/024 206/438 |
| 2001/0039807 | A1 | 11/2001 | Mogji | |
| 2002/0099567 | A1 | 7/2002 | Joao | |
| 2002/0102992 | A1 | 8/2002 | Koorapaty | |
| 2002/0119880 | A1 | 8/2002 | Hogberg et al. | |
| 2002/0144926 | A1 | 10/2002 | Rutledge | |
| 2002/0167500 | A1 | 11/2002 | Gelbman | |
| 2003/0137968 | A1 | 7/2003 | Lareau et al. | |
| 2004/0215532 | A1 | 10/2004 | Boman | |
| 2004/0236635 | A1 | 11/2004 | Publicover | |
| 2005/0046584 | A1 | 3/2005 | Breed | |
| 2005/0171738 | A1 | 8/2005 | Kadaba | |
| 2005/0234785 | A1 | 10/2005 | Burman | |
| 2005/0246192 | A1 | 11/2005 | Jauffred et al. | |
| 2006/0080819 | A1 | 4/2006 | McAllister | |
| 2006/0168644 | A1 | 7/2006 | Richter et al. | |
| 2007/0009119 | A1 | 1/2007 | Pohle et al. | |
| 2007/0028642 | A1 | 2/2007 | Glade et al. | |
| 2007/0095722 | A1 | 5/2007 | Messinger | |
| 2007/0268138 | A1 | 11/2007 | Chung et al. | |
| 2008/0094209 | A1 | 4/2008 | Braun | |
| 2008/0162304 | A1 | 7/2008 | Ourega | |
| 2008/0208158 | A1 | 8/2008 | Goodman et al. | |
| 2008/0291033 | A1 | 11/2008 | Aghassipour | |
| 2009/0014537 | A1 | 1/2009 | Gelbman | |
| 2009/0293524 | A1 | 12/2009 | Vezina et al. | |
| 2009/0314835 | A1 | 12/2009 | Jackson | |
| 2010/0025274 | A1 | 2/2010 | Stopek et al. | |
| 2010/0080168 | A1 | 4/2010 | Fukuyama | |
| 2010/0204558 | A1 | 7/2010 | Zocchi | |
| 2010/0299278 | A1 | 11/2010 | Kriss et al. | |
| 2011/0031304 | A1 | 2/2011 | Philips | |
| 2011/0176749 | A1 | 7/2011 | Race | |
| 2011/0216178 | A1 | 9/2011 | Carpenter | |
| 2014/0144800 | A1 | 5/2014 | Delorme et al. | |
| 2014/0319022 | A1 | 10/2014 | Chu | |
| 2015/0069072 | A1 | 3/2015 | Kelley et al. | |
| 2015/0284145 | A1 | 10/2015 | Arimoto et al. | |
| 2016/0046410 | A1 | 2/2016 | Nakamura | |
| 2016/0229622 | A1 | 8/2016 | Booska | |
| 2017/0073146 | A1 | 3/2017 | Kuhn et al. | |
| 2019/0119027 | A1 | 4/2019 | Itou et al. | |
| 2019/0175448 | A1 | 6/2019 | Obrad et al. | |
| 2020/0369435 | A1 | 11/2020 | Greenwood et al. | |
| 2021/0315201 | A1 | 10/2021 | McCormick | |
| 2023/0225942 | A1 | 7/2023 | Smith | |
| 2023/0227209 | A1 | 7/2023 | Smith | |
| 2023/0320933 | A1 | 10/2023 | Smith | |
| 2024/0000662 | A1 | 1/2024 | Smith | |

FOREIGN PATENT DOCUMENTS

| | | | |
|---|---|---|---|
| CN | 210259426 | U | 4/2020 |
| EP | 1642749 | A1 | 4/2006 |
| EP | 3409260 | A1 | 12/2018 |
| JP | 2006051968 | A | 2/2006 |
| JP | 3958213 | B2 | 8/2007 |
| JP | 2007275568 | A | 10/2007 |
| WO | 1999058425 | A1 | 11/1999 |
| WO | 2002053967 | A1 | 7/2002 |
| WO | 2007028647 | A1 | 3/2007 |
| WO | 2008041663 | A1 | 4/2008 |
| WO | 2021248238 | A1 | 12/2021 |

OTHER PUBLICATIONS

KIPO; International Search Report and Written Opinion dated Apr. 24, 2023 in PCT Application No. PCT/US2022/053024.

USPTO; Corrected Notice of Allowance dated May 24, 2023 in U.S. Appl. No. 17/580,044.

USPTO; Notice of Allowance dated Feb. 17, 2023 in U.S. Appl. No. 17/508,044.

USPTO; Non-Final Office Action dated Dec. 2, 2011 in U.S. Appl. No. 12/658,641.

Electronic Reusable Paper,http://www2.parc.com/hsl/projects/gyricon/, (Oct. 2005).

USPTO; Non-Final Office Action dated Sep. 11, 2015 in U.S. Appl. No. 12/658,641.

USPTO; Non-Final Office Action dated Dec. 2, 2011 in U.S. Appl. No. 12/852,413.

USPTO; Final Office Action dated May 10, 2012 in U.S. Appl. No. 12/852,413.

USPTO; Advisory Action dated Jul. 31, 2012 in U.S. Appl. No. 12/852,413.

USPTO; Non-Final Office Action dated Jun. 18, 2014 in U.S. Appl. No. 12/852,413.

USPTO; Non-Final Office Action dated Jun. 17, 2016 in U.S. Appl. No. 12/852,413.

USPTO; Final Office Action dated Nov. 29, 2016 in U.S. Appl. No. 12/852,413.

USPTO; Non-Final Office Action dated Jul. 25, 2017 in U.S. Appl. No. 14/589,768.

USPTO; Final Office Action dated Feb. 7, 2018 in U.S. Appl. No. 14/589,768.

USPTO; Non-Final Office Action dated Jun. 19, 2018 in U.S. Appl. No. 14/589,768.

USPTO; Final Office Action dated Dec. 27, 2018 in U.S. Appl. No. 14/589,768.

USPTO; Non Final Office Action dated Jul. 10, 2020 in U.S. Appl. No. 15/841,170.

USPTO; Notice of Allowance dated Oct. 30, 2020, in U.S. Appl. No. 15/841,170.

PCT; International Search Report dated May 31, 2002 in International Application No. PCT/US2001/049684.

PCT; International Search Report dated Jun. 28, 2010 in International Application No. PCT/US2010/023252.

PCT; Written Opinion of International Search Authority dated Jun. 28, 2010 in International Application No. PCT/US2010/023252.

PCT; International Preliminary Report on Patentability dated Mar. 22, 2013 in International Application No. PCT/US2010/023252.

PCT; International Search Report & Written Opinion dated Apr. 24, 2019 in PCT Application No. US2018/065509.

PCT; International Preliminary Report on Patentability dated Jun. 16, 2020 in PCT Application No. US2018/065509.

USPTO; Non-Final Office Action dated Jan. 25, 2024 in U.S. Appl. No. 17/580,094.

USPTO; Restriction Requirement dated Mar. 5, 2024 in U.S. Appl. No. 17/889,275.

KIPO; International Search Report and Written Opinion dated Oct. 5, 2023 in Application Serial No. PCT/US2023/025748.

KIPO; International Search Report and Written Opinion dated Jun. 29, 2023 in Application Serial No. PCT/US2023/015267.

(56) References Cited

OTHER PUBLICATIONS

USPTO; Non-Final Office Action dated Jun. 21, 2024 in U.S. Appl. No. 17/889,275.
USPTO; Notice of Allowance dated Jun. 13, 2024 in U.S. Appl. No. 17/580,094.

* cited by examiner

SECT A-A

SECT B-B

FOLDABLE CASSETTE BAGS FOR TRANSPORTING BIOMATERIALS

CROSS REFERENCE TO RELATED APPLICATION

This application is a continuation of and claims priority to U.S. patent application Ser. No. 17/580,044, entitled "FOLDABLE CASSETTE BAGS FOR TRANSPORTING BIOMATERIALS," which was filed on Jan. 20, 2022. The aforementioned application is hereby incorporated by reference herein in its entirety.

FIELD

This specification relates to a system, device or apparatus for cryogenically storing, transporting and/or shipping a liquid, such as blood, under cryogenic temperatures.

DESCRIPTION OF THE RELATED ART

Medical practitioners or professions may refrigerate or freeze blood for storage and/or transportation to a medical facility. When transporting blood, the blood may be refrigerated and stored in a blood bag. Less-dense blood plasma is often frozen at cryogenic temperatures. At cryogenic temperatures, the blood bags may shatter during transport because the storage devices that store the blood bags are brittle at cryogenic temperatures. Blood bag manufacturers may provide an overwrap bag that is made of material that is more cryogenically friendly, i.e., less brittle, and does not shatter at cryogenic temperatures. The overwrap bag is placed over the blood bag and contains the blood within the blood bag if the blood bag shatters. The overwrap bag, however, does not prevent the blood bag from shattering and does not maintain the integrity and usability of the blood that has been released.

Often, the blood bag is placed into a metallic case for transport. The metallic case holds the blood bag while in storage and during transportation. The metallic case holds the shape of the blood bag and protects the blood bag from external damage, such as cuts and punctures. The metal case, however, does not protect the blood bag from shocks and vibrations. Any impact to the metallic case also causes the blood bag to slide and impact the inner surfaces of the case which may cause the blood bag to become damaged.

Accordingly, there is a need for a system, device or apparatus to protect an article such as a blood bag from shock and vibration during storage and transfer.

SUMMARY

In general, one aspect of the subject matter described in this specification is embodied in an envelope to contain an article, for instance, a blood bag envelope. The blood bag envelope is configured to hold, support, and protect a blood bag. The envelope includes a single piece component (e.g., a monolithic component), including multiple panels that are configured to fold to form an enclosure that surrounds the blood bag.

These and other embodiments may optionally include one or more of the following features. The envelope may include a plurality of panels including a front panel, a back panel, a pouch back panel, a pouch front panel, a first outer edge panel, a second outer edge panel, a third outer edge panel, a first inner edge panel, and a second inner edge panel, the plurality of panels configured to fold to form an enclosure to hold the article (such as a blood bag), the enclosure including an inner pouch at least partially by the pouch front panel, the pouch back panel, the first inner edge panel, and the second inner edge panel.

The envelope may include a plurality of panels including a front panel, a back panel, a first inner side edge panel, a second inner side edge panel, a first outer side edge panel, a second outer side edge panel, a first top edge panel, and a second top edge panel, the plurality of panels configured to fold to form an enclosure to hold the blood bag, wherein in a pre-assembled state, the first inner side edge panel extends outward from a first side of the back panel, the second inner side edge panel extending outward from a second side of the back panel, the first outer side edge panel extends outward from the first side of the front panel, and the second outer side edge panel extends outward from the second side of the front panel, the second side being opposite the first side.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses and devices for transporting and storing an article such as a blood bag. The system, apparatus or device may include a plurality of envelopes ("envelopes") disposed in a sealed bag ("bag") that stores and transports a plurality of articles (such as blood bags) (i.e., each envelope in the plurality of envelopes includes a blood bag in the plurality of bags). Particular embodiments of the subject matter described in this specification may be implemented to realize one or more of the following advantages.

The envelopes disclosed herein are made from a polymeric material that is able to withstand cryogenic temperatures. That is, the envelopes are resistant to brittleness and are not as susceptible to shattering at cryogenic temperatures. The envelopes disclosed herein are configured to absorb any shocks to the envelope, and thus, protects the article from vibrations, drops, impacts, or other shocks. The envelopes disclosed herein may be produced cheaper than typical blood back transport envelopes. The envelopes disclosed herein may be produced with fewer components relative to typical blood bag transport envelopes.

The envelopes disclosed herein may be formed from a single piece component. For example, the envelopes disclosed herein are composed of a plurality of panels configured to fold over various fold lines to form the envelope for safely and securely transporting articles such as blood bags. In various embodiments, the blood bags disposed in envelopes disclosed herein may be double sealed from an external environment. The blood bags may include multiple layers between the blood bag and the external environment even though the envelope is formed from a single piece component (e.g., a monolithic component). The envelopes disclosed herein may eliminate the use of metal cassettes and other complex heavier transportation systems for blood bags. The envelopes disclosed herein may provide shock absorption from various directions while remaining light and easy to transport.

Other benefits and advantages include a crumple zone configured to dampen side impact, in accordance with various embodiments. The crumple zone may define a perimeter around where the blood bag is actually stored. The crumple zone, as well as multiple layers of the envelope (e.g., a pouch disposed within a cavity defined by the envelope), protect the blood bag from impact. Finally, while extensive reference is made to "blood bags" herein, one may appreciate that similar systems, methods, and apparatuses may be implemented for other articles, such as different biomaterials, fragile objects or substances, and the like.

Figure 1:
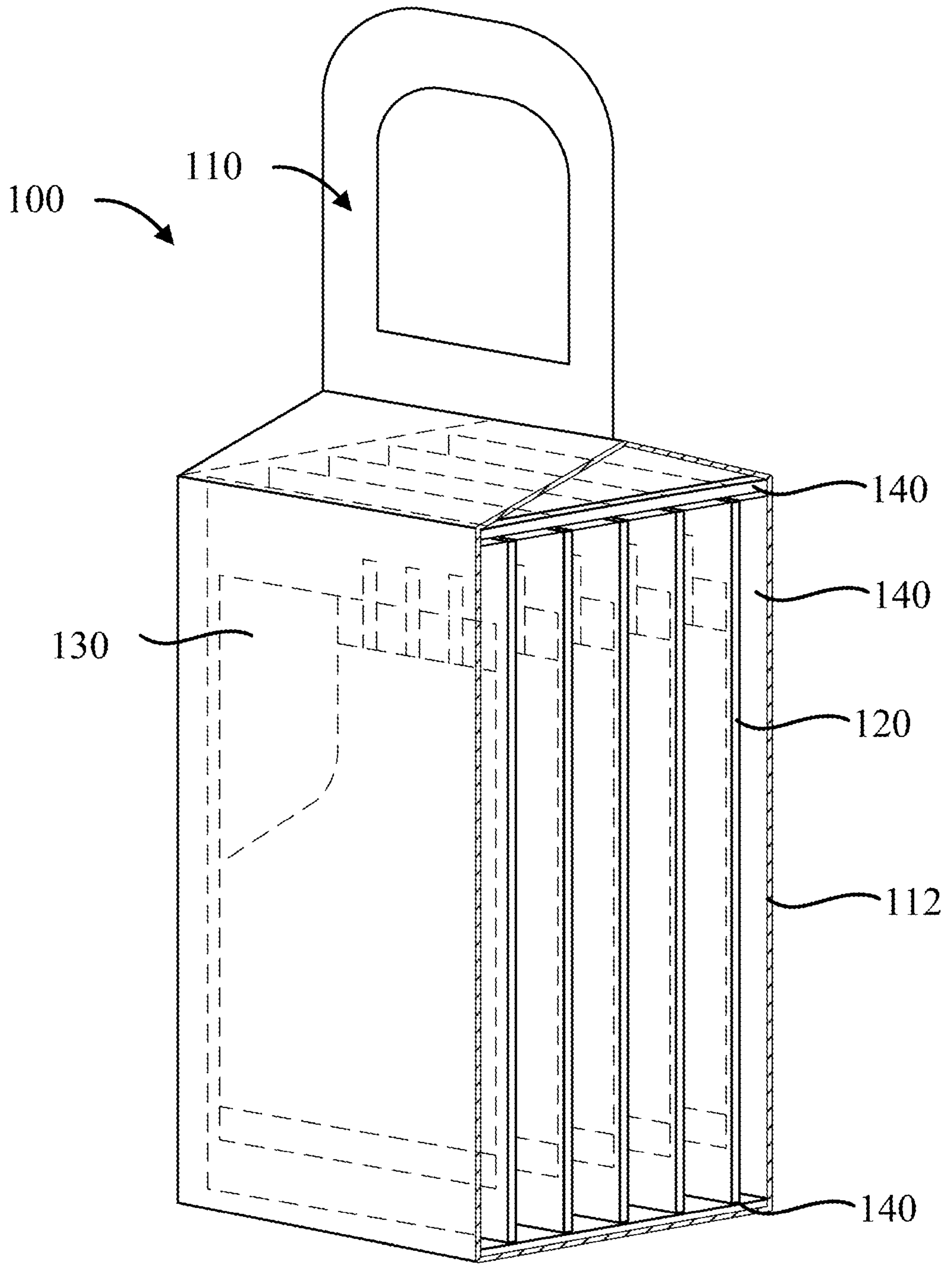
FIG. 1 illustrates a perspective cross-sectional view of a blood bag transport assembly, in accordance with various embodiments.

Referring now to FIG. 1, a perspective cross-sectional view of a blood bag transport assembly 100 is illustrated, in accordance with various embodiments. The blood bag transport assembly 100 comprises a carrying bag 110, a plurality of envelopes 120, a plurality of blood bags 130, and absorbent material layers 140. Each envelope in the plurality of envelopes 120 is configured to house a blood bag in the plurality of blood bags 130. In this regard, each envelope in the plurality of envelopes 120 is configured to protect and/or support a respective blood bag in the plurality of blood bags 130 during transportation of the blood bag transport assembly 100.

In various embodiments, absorbent material layers 140 may at least partially surround the plurality of envelopes 120. For instance, at least a portion of the absorbent material layers 140 may be arranged abutting an internal perimeter of the carrying bag 110). The plurality of envelopes 120 may be received into an area defined by the internal perimeter of the carrying bag 110. Thus, one or more absorbent material layer 140 may be adjacent both an envelope 120 and a wall of the internal perimeter of the carrying bag 110. More specifically, one or more absorbent material layer 140 may be interstitial between the envelope 120 and the wall of the internal perimeter of the carrying bag 110. In various embodiments, adjacent envelopes in the plurality of envelopes 120 may be separated by absorbent material layers 140 disposed between the adjacent envelopes. In this regard, the plurality of envelopes 120 may be dampened in all directions by absorbent material layers 140 during transport of the blood bag transport assembly 100 (i.e., mechanically dampened from shock and vibration of the carrying bag 110 that may occur during transport). Thus, each blood bag in the plurality of blood bags 130 may be dampened by a respective envelope in the plurality of envelopes 120 as described further herein, as well as being dampened by the absorbent material layers 140 disposed within a cavity 112 defined by the carrying bag 110 as described further herein.

Figure 2A:
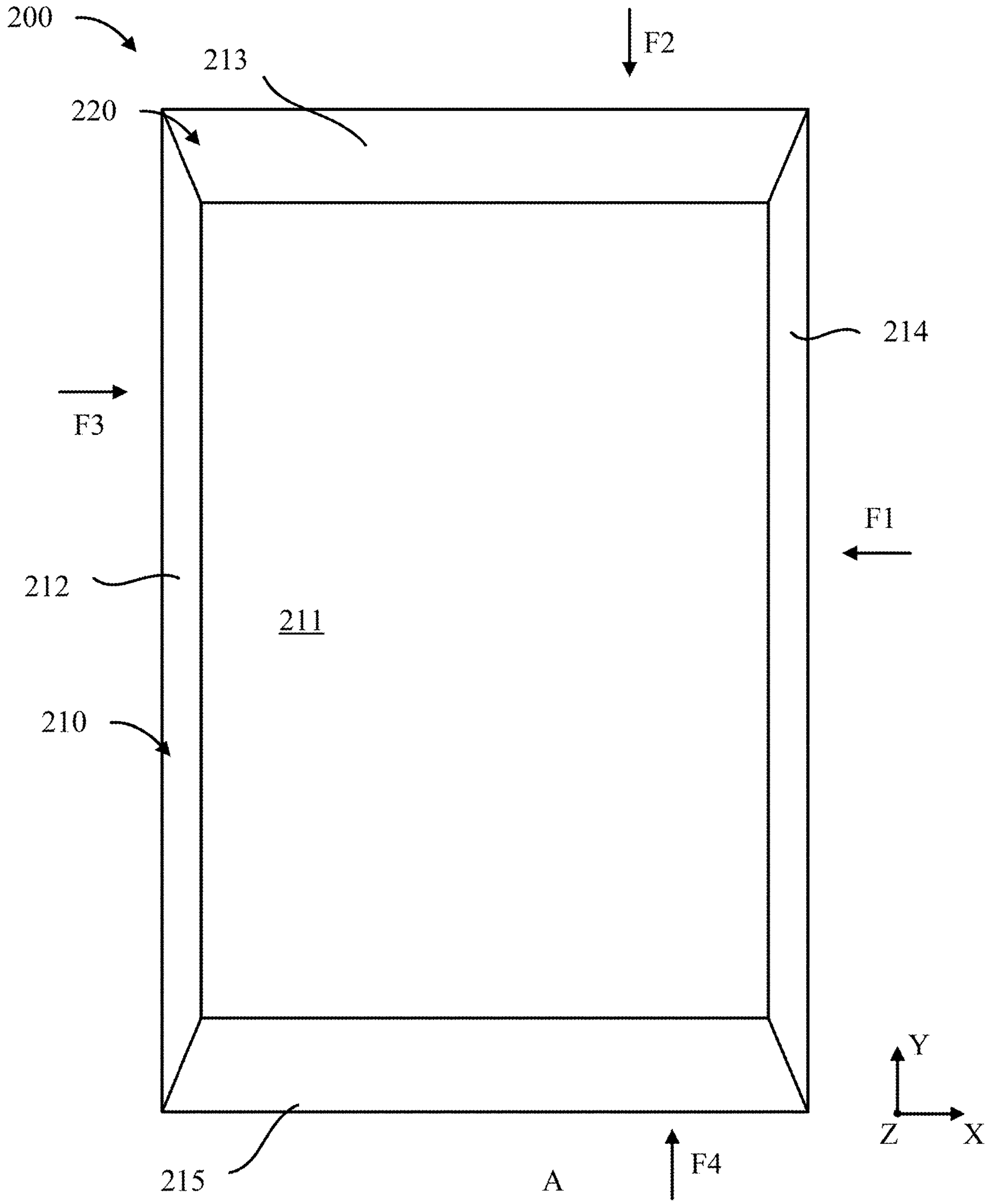
FIG. 2A illustrates a front planar view of an envelope for use in the blood bag transport assembly, in accordance with various embodiments.

Referring now to FIG. 2A, a front planar view of the envelope 200 is illustrated in connection with X-Y-Z axes and in accordance with various embodiments. The envelope 200 may be utilized in a blood bag transport assembly 100 from FIG. 1 in the plurality of envelopes 120. The envelope 200 may be made of a polymeric material configured to withstand cryogenic temperatures without shattering or breaking. The envelope may hold, enclose and protect different sizes of blood bags, such as a 50-ml blood bag, a 250-ml blood bag, and/or a 500-ml blood bag, or the like. In various embodiments, the envelope 200 is a monolithic component (e.g., formed of a single piece of material), as described further herein. In this regard, the envelope 200 may reduce a part count for blood bag envelopes, which typically utilize several components to properly hold, enclose, and protect blood bags, in accordance with various embodiments.

The envelope 200 comprises a front panel 210. The front panel 210 comprises an inner front panel 211, and front side panels 212, 213, 214, 215, and more specifically, a first front side panel 212, an upper front side panel 213, a second front side panel 214 opposite the first front side panel 212, and a lower front side panel 215 opposite the upper front side panel 213. The front side panels 212, 213, 214, 215 surround, and define a perimeter of, the inner front panel 211. The front side panels 212, 213, 214, 215 partially define a crumple zone 220. The crumple zone 220 defines a perimeter around the inner front panel 211. In this regard, the crumple zone 220 is configured to dampen any forces (e.g., F1, F2, F3, F4) exposed to a side of the envelope 200 during transportation of the envelope 200 via blood bag transport assembly 100 from FIG. 1. In this regard, the crumple zone 220 is configured to protect a blood bag (e.g., a blood bag in the plurality of blood bags 130 from FIG. 1) in response to side impact (e.g., a force in the X-Y plane).

Figure 2B:
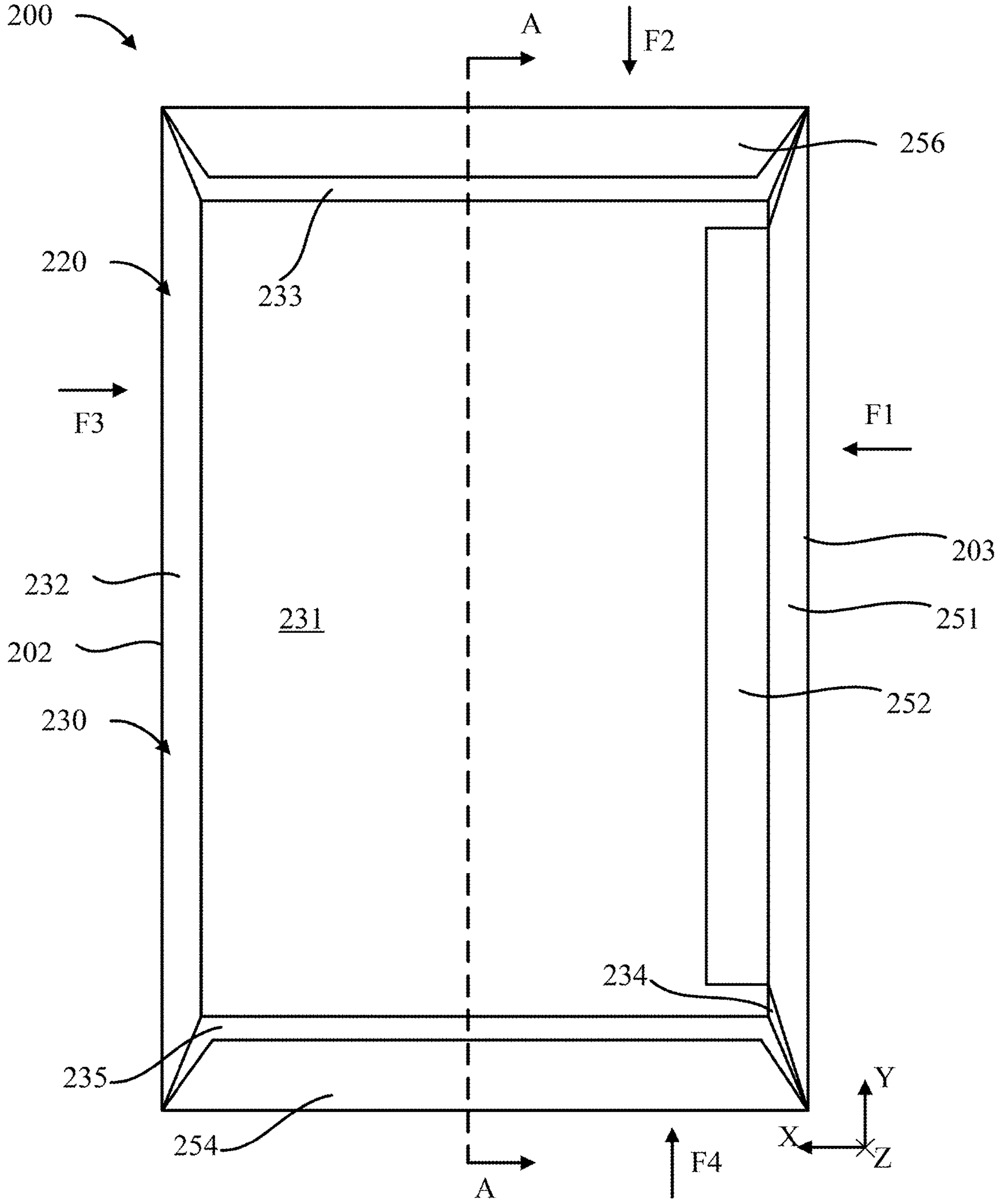
FIG. 2B illustrates a back planar view of the envelope for use in the blood bag transport assembly, in accordance with various embodiments.

Referring now to FIG. 2B, a back planar view of the envelope 200 from FIG. 2A is illustrated, in accordance with various embodiments. The envelope 200 further comprises a back panel 230. The back panel 230 comprises an inner back panel 231, and back side panels 232, 233, 234, 235 (specifically, a first back side panel 232, an upper back side panel 233, a second back side panel 234 opposite the first back side panel 232, and a lower back side panel 265 opposite the upper back side panel 233). The back side panels 232, 233, 234, 235 surround, and define a perimeter of, the inner back panel 231. The back side panels 232, 233, 234, 235 partially define the crumple zone 220. The crumple zone 220 also defines a perimeter around the back panel 230. In various embodiments, a blood bag 130 from FIG. 1 is disposed in a thickness direction of the envelope 200 (e.g., in the Z-direction) between the inner back panel 231 and the inner front panel 211 from FIG. 2A.

In this regard, the crumple zone 220 is configured to dampen any forces (e.g., F1, F2, F3, F4) exposed to a side of the envelope 200 during transportation of the envelope 200 via blood bag transport assembly 100 from FIG. 1. In this regard, the crumple zone 220 is configured to protect a blood bag (e.g., a blood bag in the plurality of blood bags 130 from FIG. 1) in response to side impact to the envelope 200.

The envelope 200 further comprises outer edge panels 252, 254, 256 (specifically a side outer edge panel 252, a lower outer edge panel 254, and an upper outer edge panel 256 disposed opposite the lower outer edge panel 254). The outer edge panel 252, 254, 256 are configured to seal an internal cavity of the envelope 200 as described further herein. The outer edge panel 252, 254, 256 are disposed on three of the four sides of back panel 230. In this regard, a crease 202 between the back side panel 232 of the back panel 230 and front side panel 212 (FIG. 2A) of the front panel 210 (FIG. 2A) seals a fourth side of the cavity of the envelope 200 from an external environment as described further herein.

In various embodiments, a portion 251 of the side outer edge panel 252 may form a portion of the crumple zone 220 (FIG. 2A). Although illustrated as comprising a shape slightly different from the back side panel 234, the present disclosure is not limited in this regard. For example, the portion 251 of the side outer edge panel 252 may have a similar shape to the back side panel 234 to facilitate folding and ease of manufacture as described further herein.

In various embodiments, each outer edge panel (e.g., outer edge panel 252, 254, 256), is coupled to an adjacent side panel (e.g., back side panel 233 for lower outer edge panel 254, back side panel 234 for side outer edge panel 252, and back side panel 235 for lower outer edge panel 254). For example, an adhesive may be disposed between each outer edge panel and the adjacent side panel to facilitate coupling of the adjacent panels and to facilitate sealing of a cavity of the envelope 200 from an external environment.

Figure 2C:
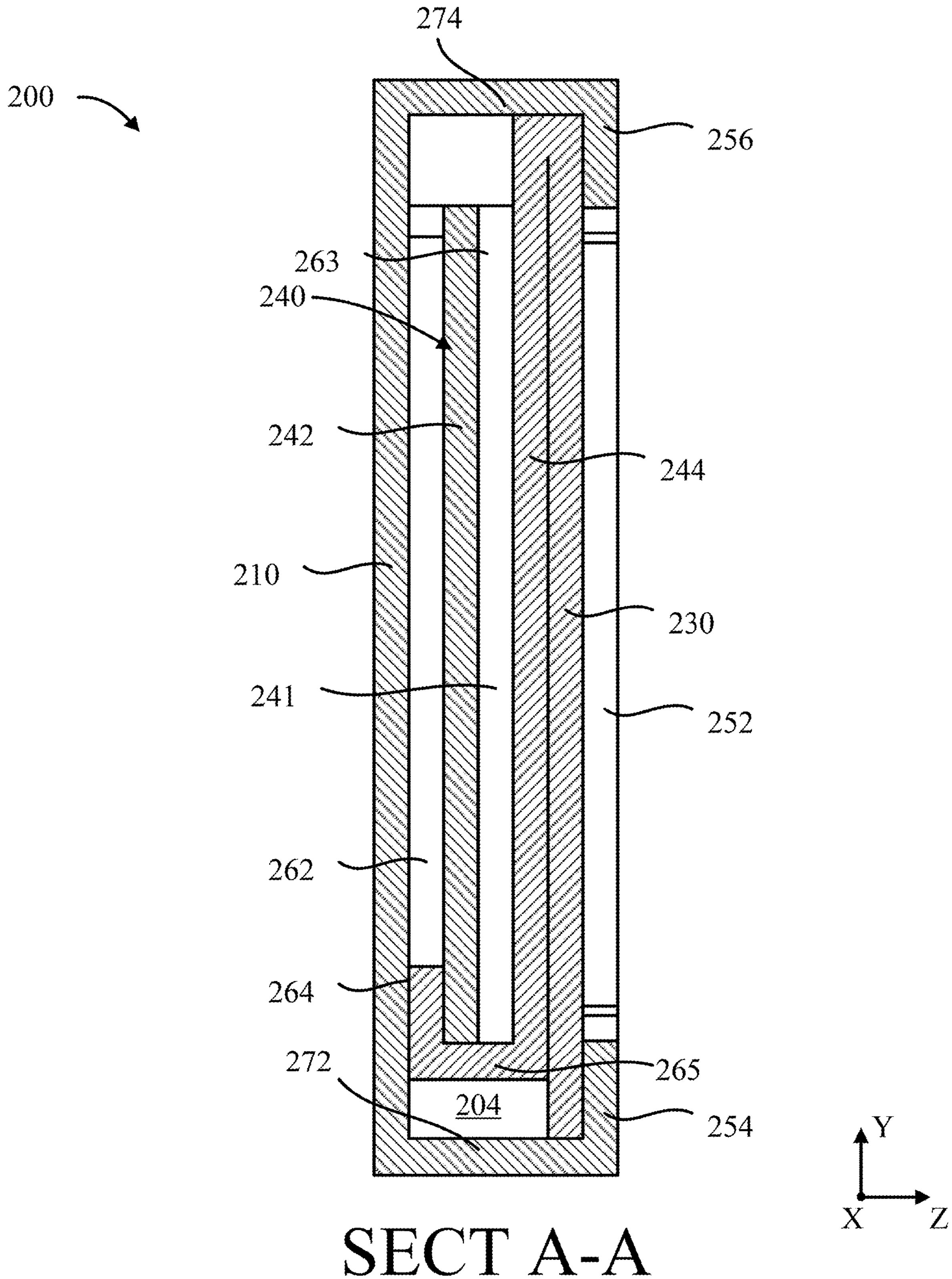
FIG. 2C illustrates a cross-sectional view of the envelope along section line A-A from FIG. 2A, in accordance with various embodiments.

Referring now to FIG. 2C, a cross-sectional view of the envelope 200 along section line A-A from FIG. 2B is illustrated, with like numerals depicting like elements, in accordance with various embodiments. One skilled in the art may recognize that the cross-section is not to scale and is illustrated in a manner to clarify structural relationships between various components of the envelope 200. For example, a bottom crease 272 between front panel 210 and lower outer edge panel 254 is shown having a relatively large thickness (e.g., in the Z-direction) when in various embodiments, layers in the z direction would be pressed together tightly at outer edges, forming an at least partially curved shape or a bow shape around a blood bag disposed in an inner pouch 240 of the envelope 200.

In various embodiments, the envelope 200 further comprises the inner pouch 240 defined at least partially by a pouch front panel 242, a pouch back panel 244, and a crease 265. The inner pouch 240 defines a blind pouch 241 configured to receive a blood bag 130 for use in a blood bag transport assembly 100 from FIG. 1. In this regard, a blood bag 130 from FIG. 1 is configured to be disposed within the blind pouch 241, providing multiple layers of protection for the blood bag 130 from FIG. 1 during transport of the blood bag. In various embodiments, the blind pouch 241 is sealed on a first side by a first inner edge panel 262 which wraps around the pouch front panel 242, from pouch back panel 244 forming a crease 263. Similarly, the blind pouch 241 is sealed on a second side by a second inner edge panel 264 which wraps around a bottom portion of the pouch front panel 242. In various embodiments, the first inner edge panel 262 and the second inner edge panel are coupled to a front side of the front pouch panel (e.g., via an adhesive, a tape, or the like).

Similar to the formation of the blind pouch 241, a cavity 204 is defined in a thickness direction (e.g., in a Z-direction) between the front panel 210 and the back panel 230. The cavity 204 is defined vertically between a bottom crease 272 and a top crease 274. The bottom crease 272 is defined by a fold between the front panel 210 and the lower outer edge panel 254. Similarly, the top crease 274 is defined by a fold between the front panel 210 and the upper outer edge panel 256. The cavity 204 is further defined in the lateral direction (e.g., the X-direction) between the crease 202 from FIG. 2B and a crease 203 from FIG. 2B. The crease 203 from FIG. 2B is defined by a fold between the front panel 210 and the side outer edge panel 252 from FIG. 2B. Thus, the blind pouch 241 is disposed entirely within the cavity 204.

Figure 3A:
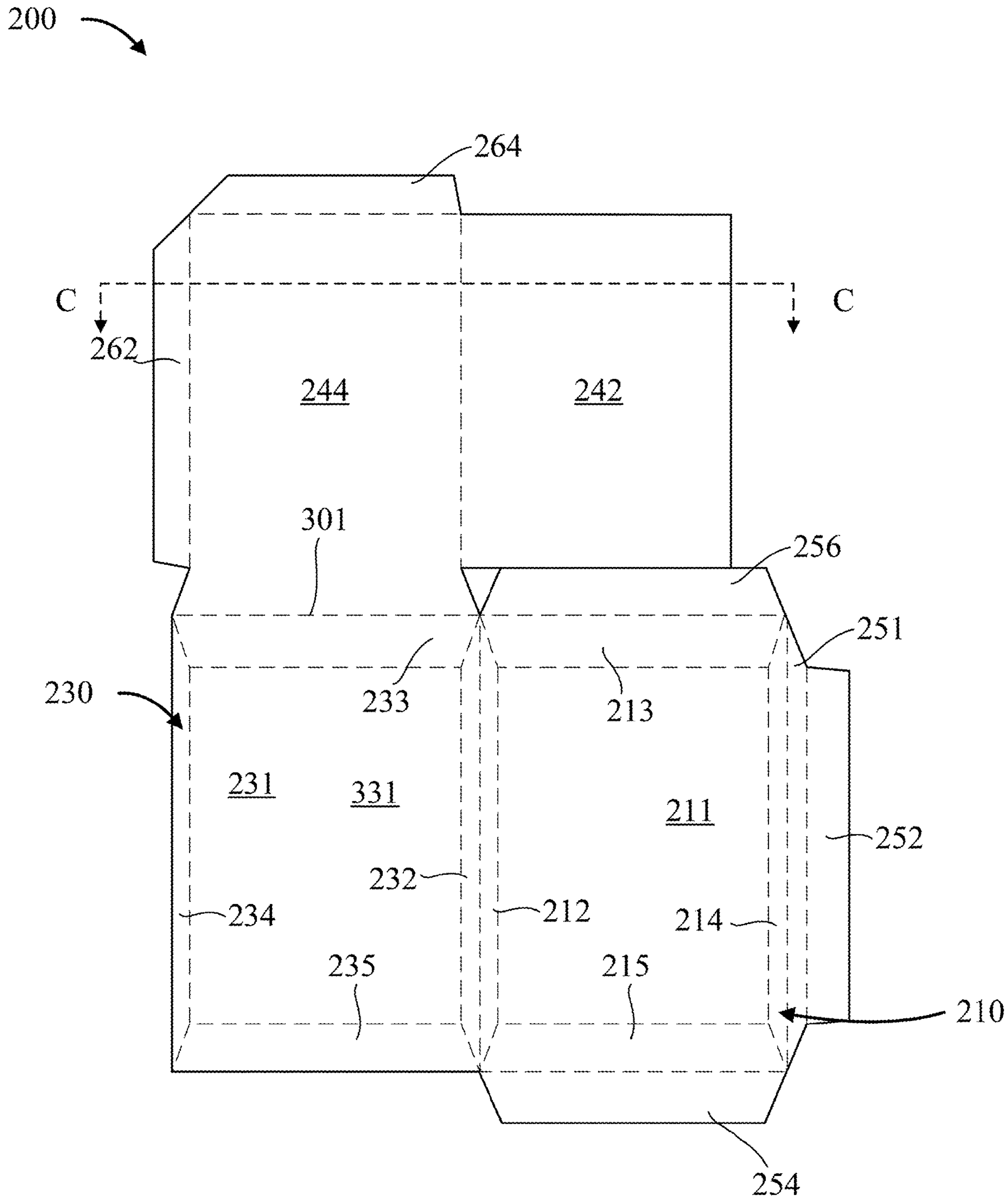
FIG. 3A illustrates the envelope during an assembly process of the envelope, in accordance with various embodiments.

Referring now to FIG. 3A, a planar view of the envelope 200 from FIGS. 2A-C in a pre-assembled state, is illustrated with like elements depicting like numerals, in accordance with various embodiments.

Figure 3B:
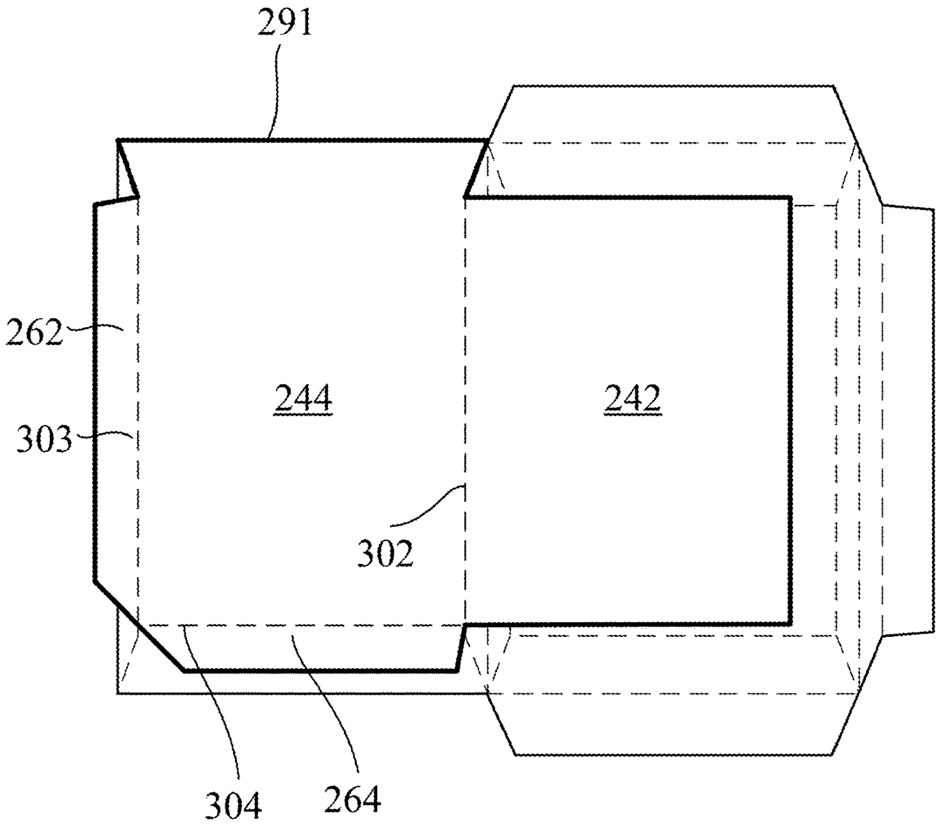
FIG. 3B illustrates the envelope during the assembly process of the envelope, in accordance with various embodiments.

With combined reference to FIGS. 3A and 3B, an assembly process for envelope 200 from FIGS. 2A-2C begins with folding the pouch back panel 244 about fold line 301 towards an internal surface 331 of inner back panel 231. In this regard, a top crease 291 is formed between the back panel 230 and the pouch back panel 244. Thus, any fold line described with respect to FIG. 3A may refer to a crease in envelope 200 from FIGS. 2A-C after assembly of the envelope 200, in accordance with various embodiments. By folding the pouch back panel 244 about the fold line 301 towards the internal surface 331, the pouch front panel 242, and the inner edge panels 262, 264 come with the pouch back panel 244 as illustrated in FIG. 3B.

Figure 3C:
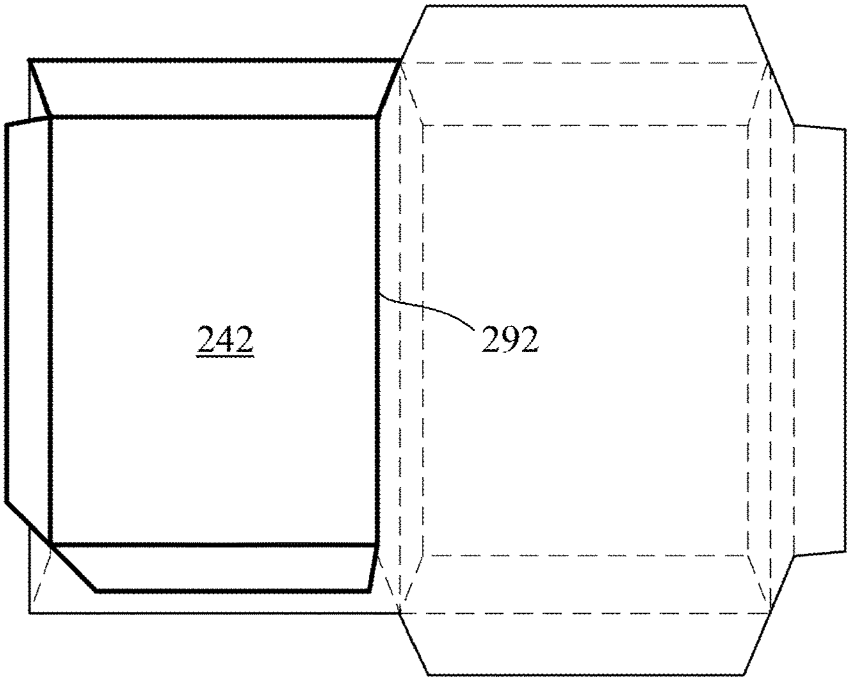
FIG. 3C illustrates the envelope during the assembly process of the envelope, in accordance with various embodiments.

Referring now to FIGS. 3A-C, the pouch front panel 242 is then folded about a fold line 302 towards the pouch back panel 244. In this regard, a crease 292 is formed between the pouch back panel 244 and the pouch front panel 242.

Figure 3D:
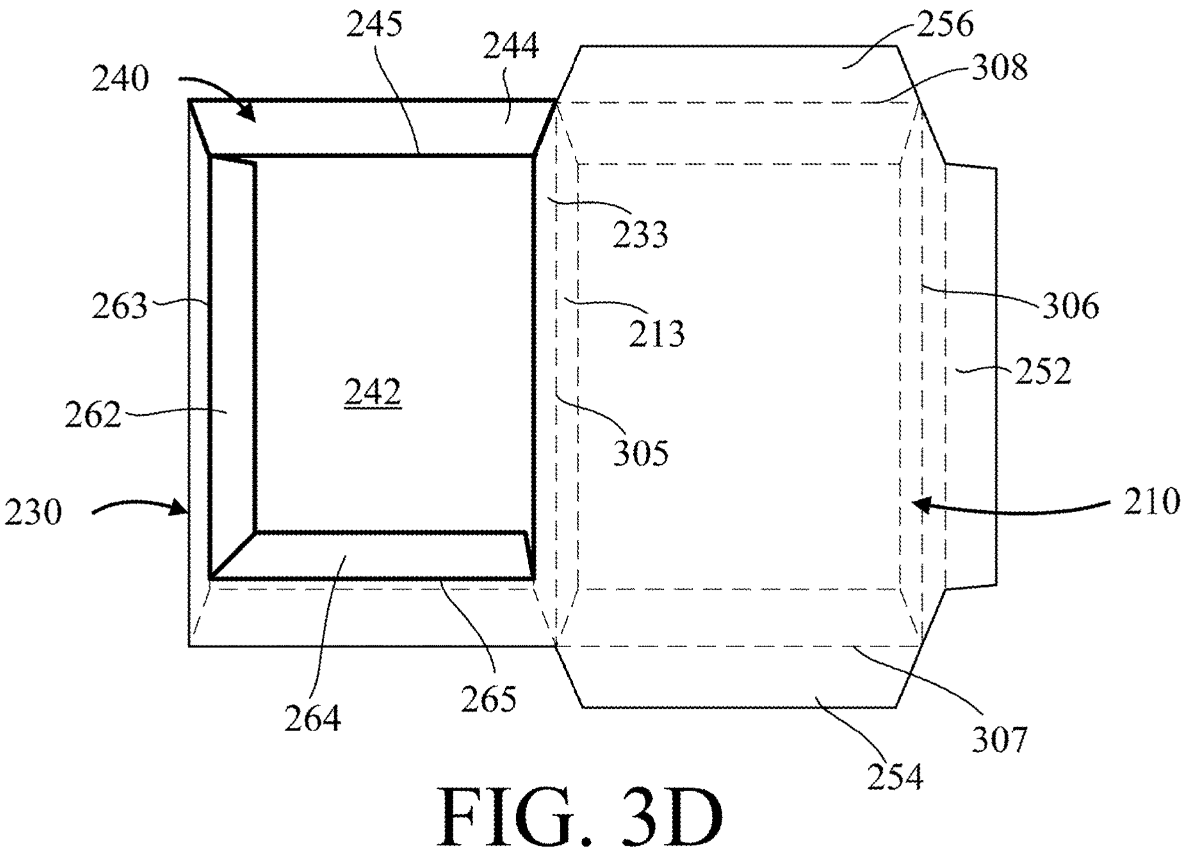
FIG. 3D illustrates the envelope during the assembly process of the envelope, in accordance with various embodiments.
Figure 3E:
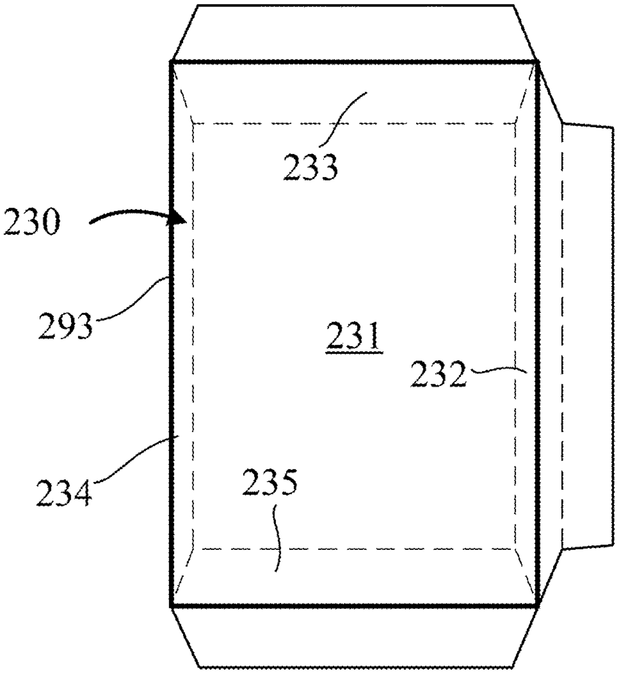
FIG. 3E illustrates the envelope during the assembly process of the envelope, in accordance with various embodiments.

Referring now to FIGS. 3A-D, the first inner edge panel 262 is folded about a fold line 303 towards the pouch front panel 242 and the second inner edge panel 264 is folded about a fold line 304 towards the pouch front panel 242. In this regard, the crease 263 is formed between the pouch back panel 244 and the first inner edge panel 262, and the crease 265 is formed between the pouch back panel 244 and the second inner edge panel 264. In this regard, the pouch front panel 242 is disposed between the pouch back panel 244 and the first inner edge panel 262, as well as being disposed between the pouch back panel 244 and the second inner edge panel 264. After folding the inner edge panels 262, 264, the first inner edge panel 262 is coupled to the pouch front panel 242 and the second inner edge panel 264 is coupled to the pouch front panel 242. Thus, the inner pouch 240 is formed in response to coupling the inner edge panels 262, 264 to the front pouch panel. In various embodiments, an opening 245 of the inner pouch 240 (FIG. 3D) is defined between the pouch back panel 244 and the pouch front panel 242. In this regard, the opening 245 is configured to receive a blood bag 130 from FIG. 1 therein. As shown in FIG. 3D, the inner pouch 240 is disposed entirely, or near entirely, internal to the back side panels 232, 233, 234, 235.

Referring now to FIGS. 3A-E, the assembly process further comprises folding the back panel 230 about a fold line 305 toward the front panel 210. In this regard, a crease 293 is formed between the back side panel 233 of the back panel 230 and the front side panel 213 of the front panel 210. In response to folding the back panel 230 about the fold line 305, the inner pouch 240 comes with the back panel 230 and becomes disposed entirely between the front panel 210 and the back panel 230 as illustrated in FIG. 2C.

Referring now to FIGS. 3A-F, the assembly process further comprises folding the side outer edge panel 252 about a fold line 306 toward the back panel 230, folding the lower outer edge panel 254 about a fold line 307 toward the back panel 230, and folding the upper outer edge panel 256 about a fold line 308 toward the inner back panel 231. In this regard, a crease 294 is formed between the side outer edge panel 252 and the front panel 210, the bottom crease 272 is formed between the lower outer edge panel 254 and the front panel 210, and the top crease 274 is formed between the upper outer edge panel 256 and the front panel 210. In various embodiments, the assembly process further comprises coupling the outer edge panel 252, 254, 256 to the back panel 230 (e.g., via an adhesive, tape, or the like). Thus, the envelope 200 from FIGS. 2A-2C is manufactured from a single piece of polymeric material as shown in FIG. 3A folded about various fold lines 301, 302, 303, 304, 305, 306, 307, 308.

Thus, the cavity 204 from FIG. 2C is defined laterally between the crease 293 and the crease 294, and the cavity 204 is defined vertically between the bottom crease 272 and the top crease 274 as described previously herein.

Figure 3F:
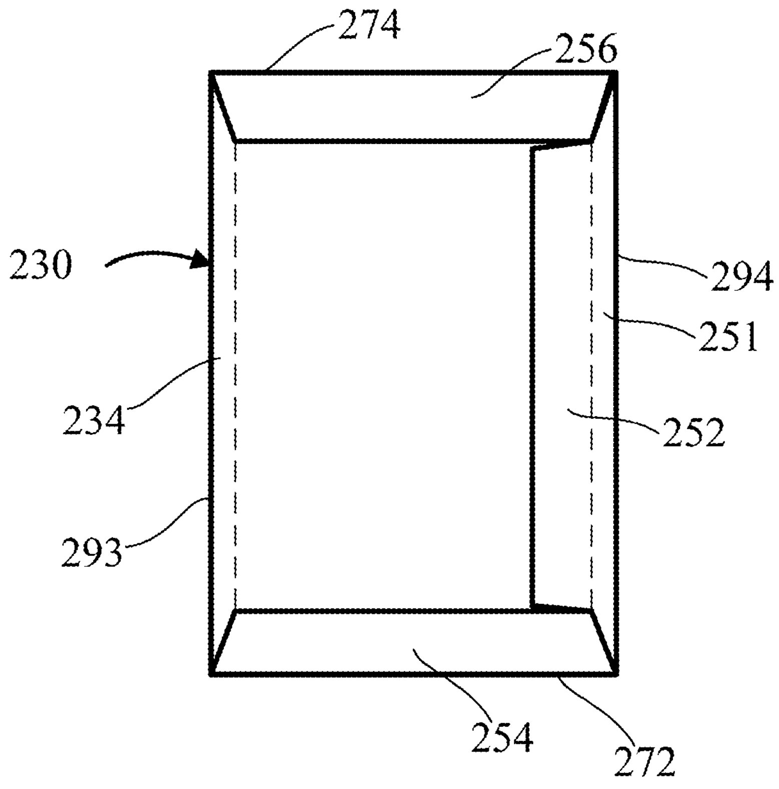
FIG. 3F illustrates the envelope during the assembly process of the envelope, in accordance with various embodiments.

Referring now to FIG. 3F, upper outer edge panel 256 may remain open after assembly and be the last outer edge panel in the outer edge panel 252, 254, 256 to be sealed. In this regard, the upper outer edge panel 256, in response to being in an open state, provides direct access to the inner pouch 240 from FIG. 2C. In this regard, the blood bag 130 from FIG. 1 may be disposed in the inner pouch 240 through an opening between the front panel 210 and the back panel 230, and then the upper outer edge panel 256 is sealed to provide the protective envelope 200 for transporting the blood bag 130 from FIG. 1, in accordance with various embodiments.

Figure 4A:
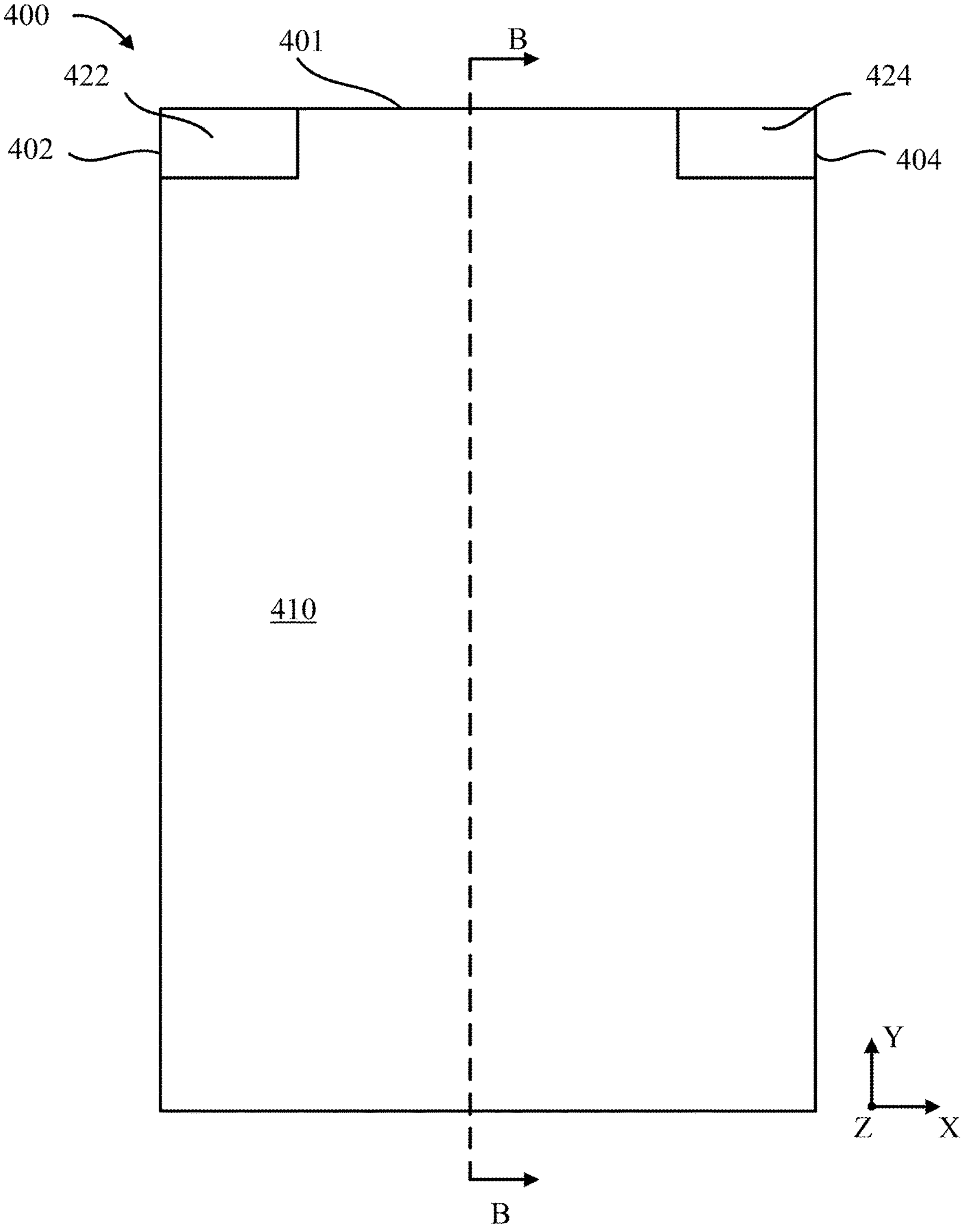
FIG. 4A illustrates a front planar view of an envelope for use in a blood bag transport assembly, in accordance with various embodiments.

Referring now to FIG. 4A, a front planar view of an envelope 400 is illustrated in accordance with various embodiments. The envelope 400 may be utilized in a blood bag transport assembly 100 from FIG. 1 in the plurality of envelopes 120. The envelope 400 may be made of a polymeric material configured to withstand cryogenic temperatures without shattering or breaking. The envelope 400 may hold, enclose and protect different sizes of blood bags, such as a 50-ml blood bag, a 250-ml blood bag, and/or a 500-ml blood bag, or the like. In various embodiments, the envelope 400 is a monolithic component (e.g., formed of a single piece of material), as described further herein. In this regard, the envelope 400 may reduce a part count for blood bag envelopes, which typically utilize several components to properly hold, enclose, and protect blood bags, in accordance with various embodiments.

Figure 4B:
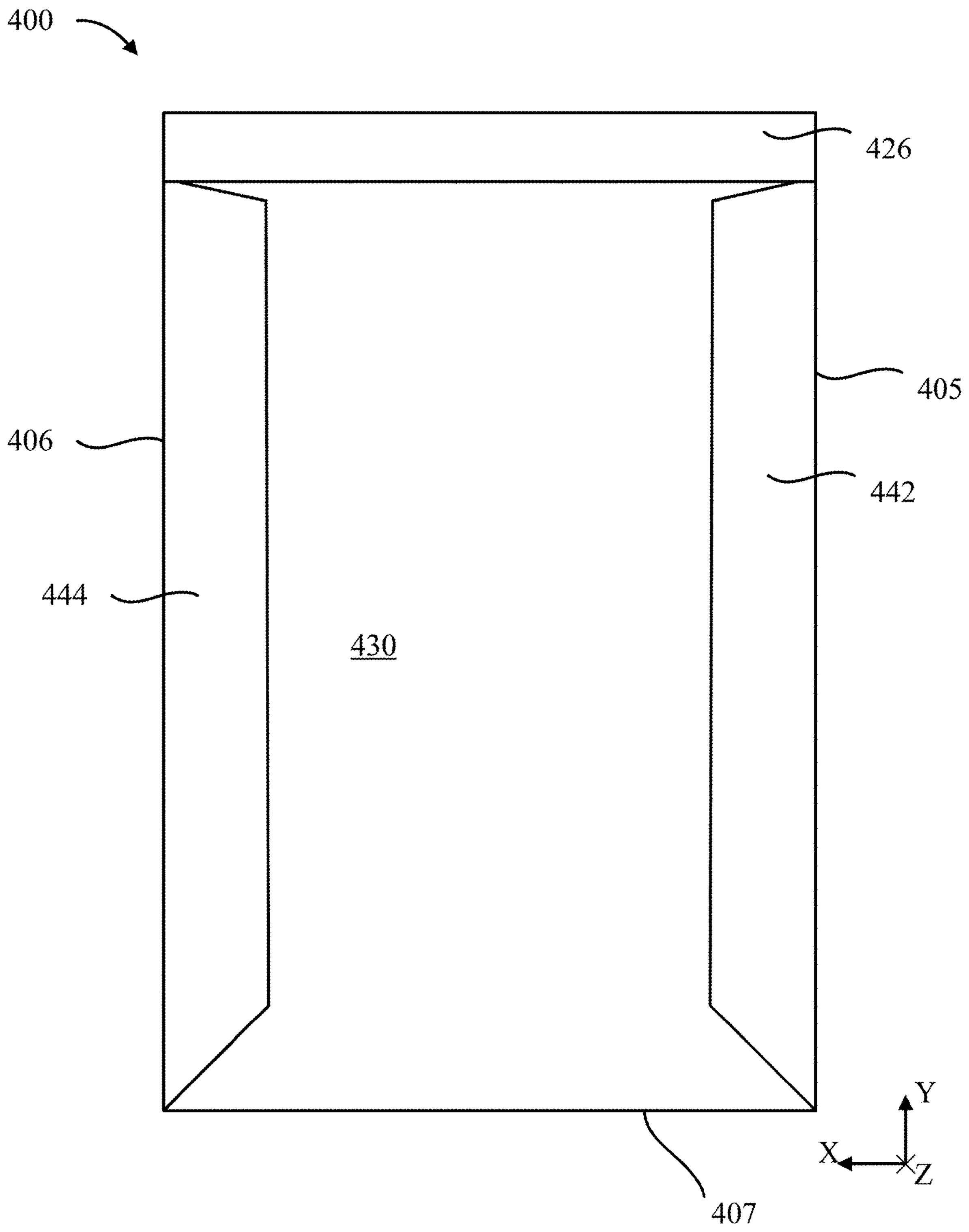
FIG. 4B illustrates a back planar view of the envelope for use in the blood bag transport assembly, in accordance with various embodiments.

The envelope 400 comprises a front panel 410. The front panel 410 is coupled to a top edge main panel 426 from FIG. 4B via top edge side panels 422, 424 as described further herein. The top edge main panel 426 from FIG. 4B and the front panel 410 define a top crease 401. Similarly, the top edge main panel 426 and the top edge side panel 422 define a crease 402 sealing a side of the envelope 400, and the top edge main panel 426 and the top edge side panel 424 define a second crease 404 sealing a second side of the envelope 400, the second side opposite the first side. Thus, the back panel 430 from FIG. 4B is disposed between the top edge main panel 426 and the front panel 410, and the top edge main panel 426 is configured to seal an opening defined between the front panel 410 and the back panel 430 from FIG. 4B, in accordance with various embodiments. Similarly, the front panel 410 and the back panel 430 are disposed between the top edge main panel 426 and the top edge side panels 422, 424 for a portion of each side further sealing the opening defined between the back panel 430 and the front panel 410.

Referring now to FIG. 4B, a back planar view of the envelope 400 from FIG. 4A is illustrated, in accordance with various embodiments. The envelope 400 further comprises outer side edge panels 442, 444. The outer side edge panel 442 and the front panel 410 from FIG. 4A define a crease 405. Similarly, the outer side edge panel 444 and the front panel 410 from FIG. 4A define a crease 406. The outer side edge panel 442 is coupled to the back panel 430 by any method, such as via an adhesive, tape, or the like. Similarly, the outer side edge panel 444 is coupled to the back panel 430. In this regard, the crease 405 seals a first side between the front panel 410 and the back panel 430, and the crease 406 seal a second side between the front panel 410 and the back panel 430, in accordance with various embodiments. In various embodiments, the front panel 410 from FIG. 4A and the back panel 430 from FIG. 4B define a bottom crease 407.

Figure 4C:
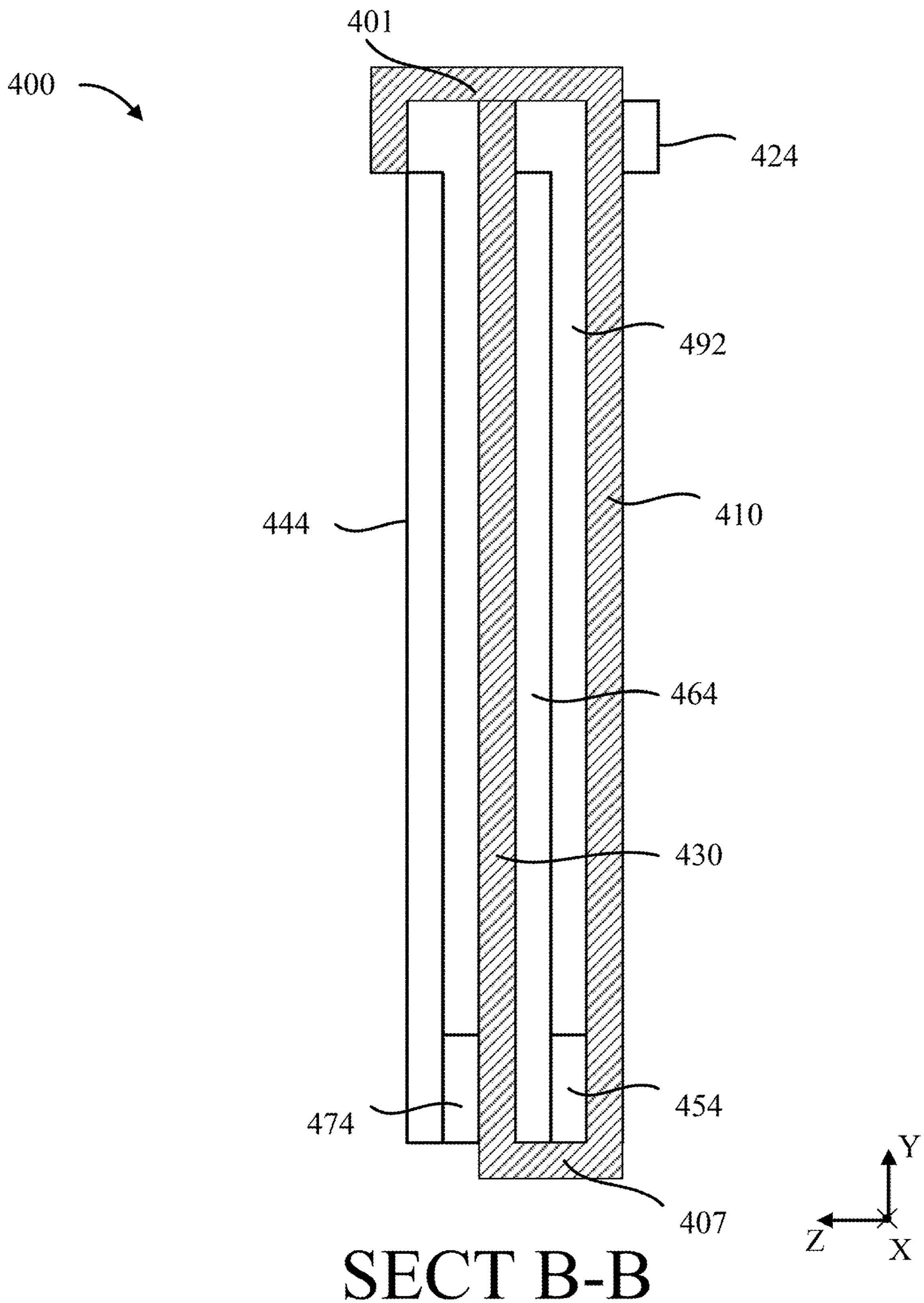
FIG. 4C illustrates a cross-sectional view of the envelope along section line A-A from FIG. 4A, in accordance with various embodiments.

Referring now to FIG. 4C, a cross-sectional view along section line B-B with like numerals depicting like elements, is illustrated in accordance with various embodiments. One skilled in the art may recognize that the envelope is mirrored about the cross sectional line B-B. Thus, a cross-section facing towards the side having top edge side panel 422 and outer side edge panel 442 would correspond to section B-B illustrated in FIG. 4C. In various embodiments, the envelope 400 comprises a cavity 492 defined in a thickness direction (e.g., the Z-direction) between the front panel 410 and the back panel 430. In various embodiments, the cavity 492 is defined in a vertical direction (e.g., the Y-direction) between the bottom crease 407 and the top crease 401.

In various embodiments, the envelope further comprises an inner side edge panel 464. The inner side edge panel 464 is folded inward from the back panel 430 as described further herein and configured to mate with an internal surface of the front panel 410. In this regard, the envelope 400 may comprise redundant sealing on the sides of the envelope from the inner side edge panel 464 and the crease 406 formed between outer side edge panel 444 and the front panel 410.

Thus, in various embodiments, the cavity 492 is defined in a lateral direction (e.g., the X-direction) between opposite inner edge panels (e.g., inner side edge panel 464 and an inner edge panel disposed on the laterally opposite side), in accordance with various embodiments. The cavity 492 is configured to receive a blood bag 130 from FIG. 1 for use in blood bag transport assembly 100, in accordance with various embodiments.

In various embodiments, the envelope 400 further comprises corner panels 454, 474. The corner panels 454, 474 further facilitate folding of the side edge panels 444, 464. For example, corner panel 474 wraps around inner side edge panel 464 and back panel 430 and is directly coupled to the corner panel 454 by a crease as described further herein.

Figure 5A:
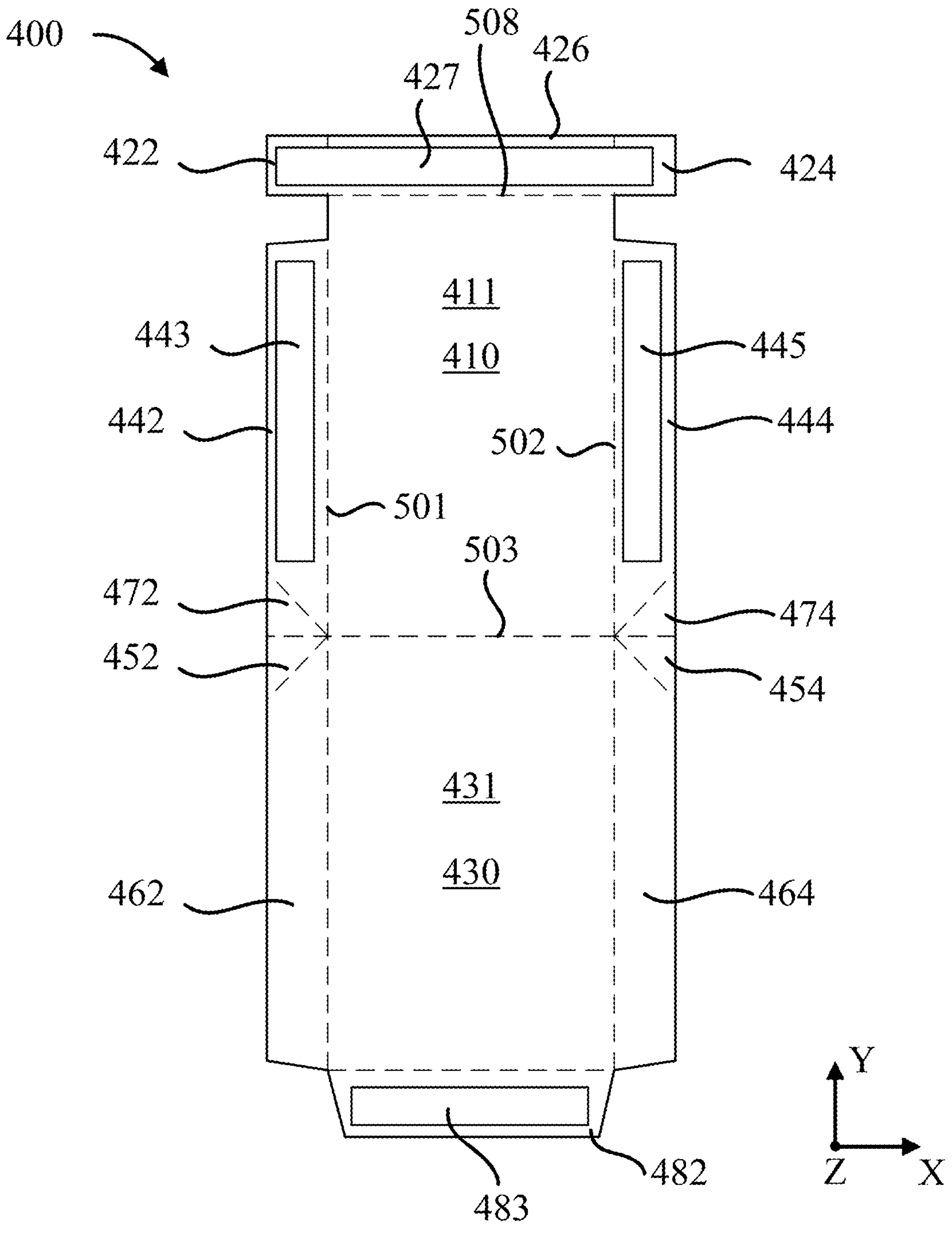
FIG. 5A illustrates the envelope during the assembly process of the envelope, in accordance with various embodiments.

Referring now to FIG. 5A, a planar view of the envelope 400 from FIGS. 4A-C in a pre-assembled (e.g., a pre-folded) state, is illustrated with like elements depicting like numerals, in accordance with various embodiments. In the pre-folded state, all the panels (e.g., front panel 410, back panel 430, edge panels 422, 424, 426, 442, 444, 462, 464, 482, and corner panels 452, 454, 472, 474) are in the same plane (e.g., the XY plane).

Figure 5B:
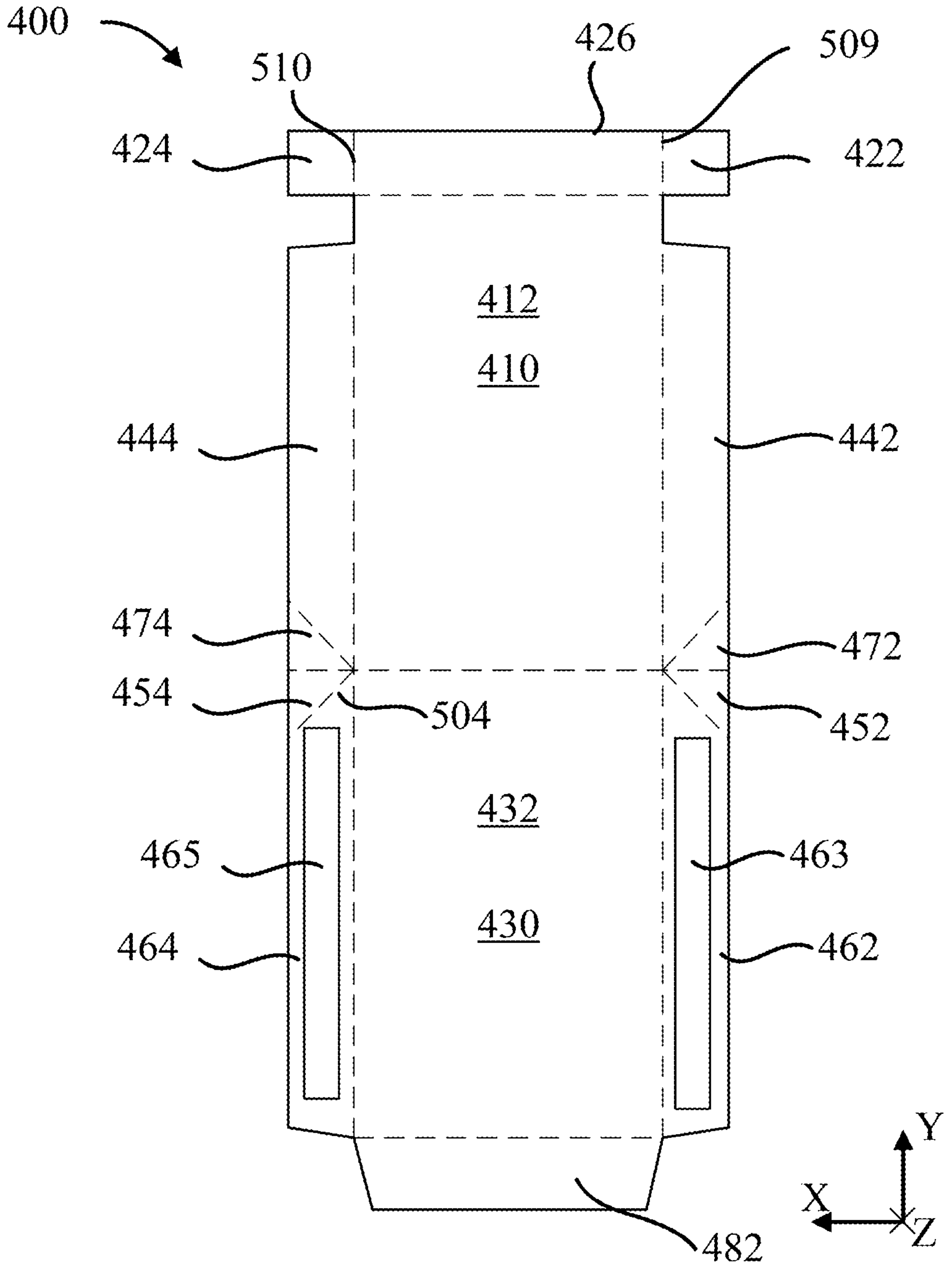
FIG. 5B illustrates the envelope during the assembly process of the envelope, in accordance with various embodiments.

Referring now to FIGS. 5A-B, a planar view of the envelope 400 from FIGS. 4A-C in a pre-assembly (e.g., a pre-folded) state showing internal surface 411 of the front panel 410 and internal surface 431 of the back panel 430 (FIG. 5A) and showing external surface 412 of the front panel 410 and external surface 432 of the back panel 430 (FIG. 5B) are illustrated in accordance with various embodiments.

In various embodiments, on the internal side (in the pre-folded state as shown in FIG. 5A), the top edge panels 422, 424, 426 comprises an adhesive 427. Similarly, a second top edge main panel 482 disposed adjacent to the back panel 430 may comprise an adhesive 483 disposed on the internal side (in the pre-folded state as shown in FIG. 5A). The outer side edge panel 442 may comprise an adhesive 443 (e.g., tape, glue, or the like) on the internal side, and the outer side edge panel 444 may comprise an adhesive 445 (e.g., tape, glue, or the like) on the internal side.

In various embodiments, on the external side (in the pre-folded state as shown in FIG. 5B), the inner side edge panel 462 may comprise an adhesive 463 and the inner side edge panel 464 may comprise an adhesive 465. As disclosed herein, an "adhesive" may refer to any adhesive known in the art, such as tape, glue, epoxy, or the like. The present disclosure is not limited in this regard. Although described as having an adhesive in a specific location, the present disclosure is not limited in this regard. For example, any mating surface may contain the adhesive as opposed to the surface indicated. For example, adhesive 427 may be disposed on the external side (FIG. 5B) of the second top edge main panel 482 in accordance with various embodiments.

With reference now to FIGS. 5A-G, an assembly process for forming the envelope 400 from FIGS. 4A-C is illustrated, in accordance with various embodiments. The assembly process comprises folding the outer side edge panels 442, 462, 444, 464 inward (i.e., toward the front panel 410 and the back panel 430). In this regard, the outer side edge panels 442, 462 disposed on a first side of the front panel 410 and the back panel 430 are folded over a fold line 501, and the side edge panels 444, 464 disposed on a second side of the front panel 410 and the back panel 430 are folded over a fold line 502 toward internal surface 411 of the front panel 410.

Figure 5C:
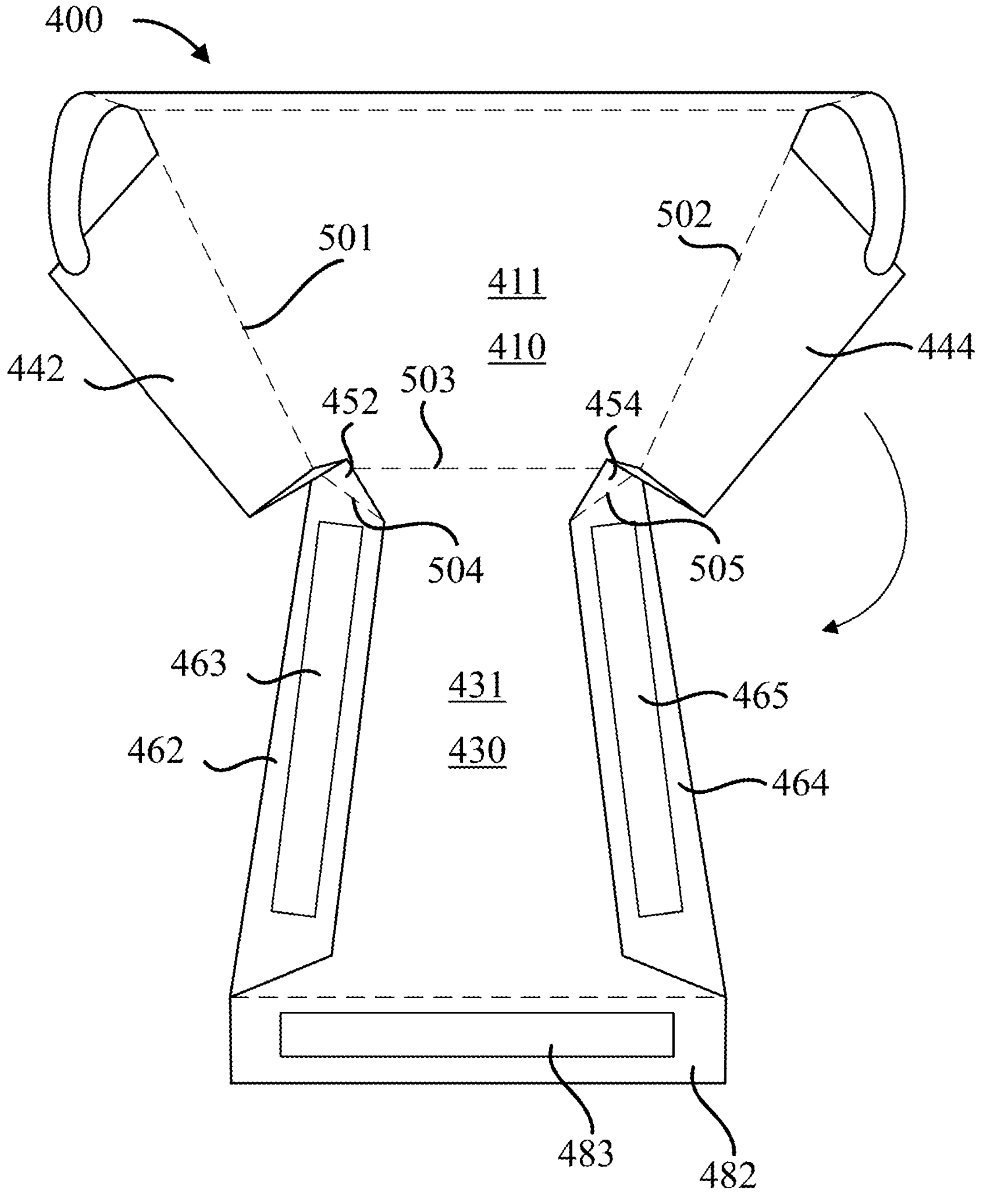
FIG. 5C illustrates the envelope during the assembly process of the envelope, in accordance with various embodiments.

The assembly process further comprises folding the front panel 410 about the fold line 503 toward the internal surface 431 of the back panel 430. At an approximately 90 degree angle between the internal surface 411 of the front panel 410 and the internal surface 431 of the back panel 430 as illustrated in FIG. 5C, the outer side edge panels 442, 444 are folded outward from the internal surface 411 of the front panel 410 about their respective fold lines (e.g., fold line 501 for outer side edge panel 442 and fold line 502 for outer side edge panel 444 while inner side edge panels 462, 464 remain folded inward and in contact with the internal surface 431 of the back panel 430. In this regard, the corner panel 452 is folded about the fold line 504 and the corner panel 454 is folded about the fold line 505. The assembly process further comprises continuing folding the internal surface 411 of the front panel 410 toward the internal surface 431 of the back panel 430 until the adhesives 463, 465 of the inner side edge panels 462, 464 and the adhesive 483 of second top edge main panel 482 mate with the internal surface 411 of the front panel 410. In this regard, a first seal may be created between the sides of the envelope 400 from FIGS. 4A-C. Thus, after this step, an internal cavity of the bag may have a first seal from the external environment. In this regard, for assembling the envelope 400 with a blood bag 130 from FIG. 1, the blood bag 100 may be placed on internal surface 431 of the back panel 430 or on the internal surface 411 of the front panel 410 prior to assembly in accordance with various embodiments.

Figure 5D:
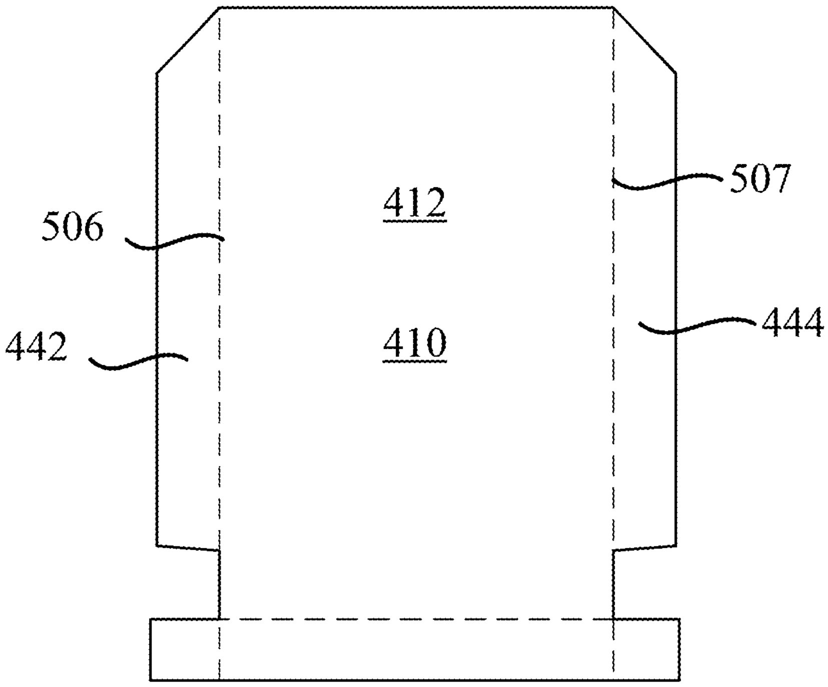
FIG. 5D illustrates the envelope during the assembly process of the envelope, in accordance with various embodiments.
Figure 5E:
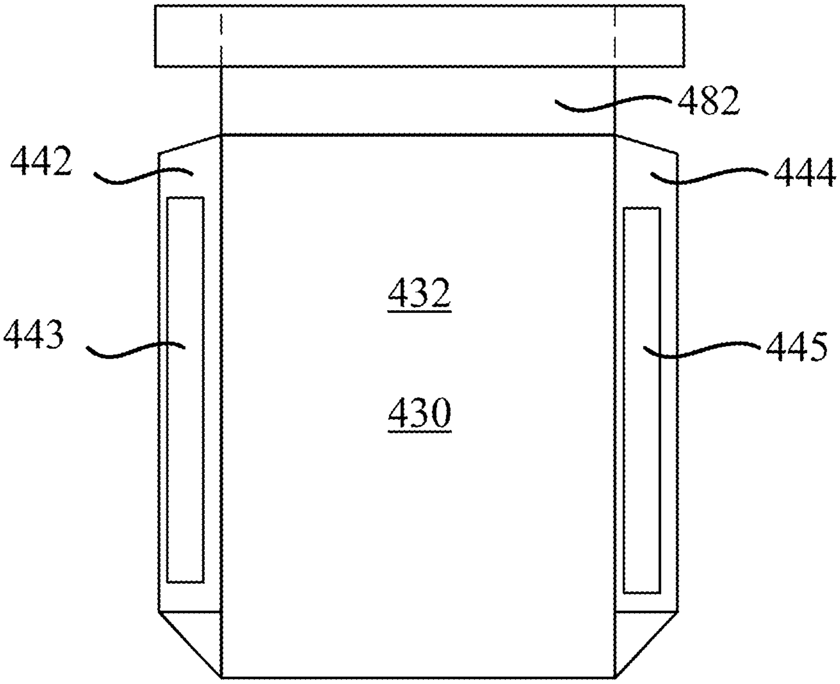
FIG. 5E illustrates the envelope during the assembly process of the envelope, in accordance with various embodiments.
Figure 5F:
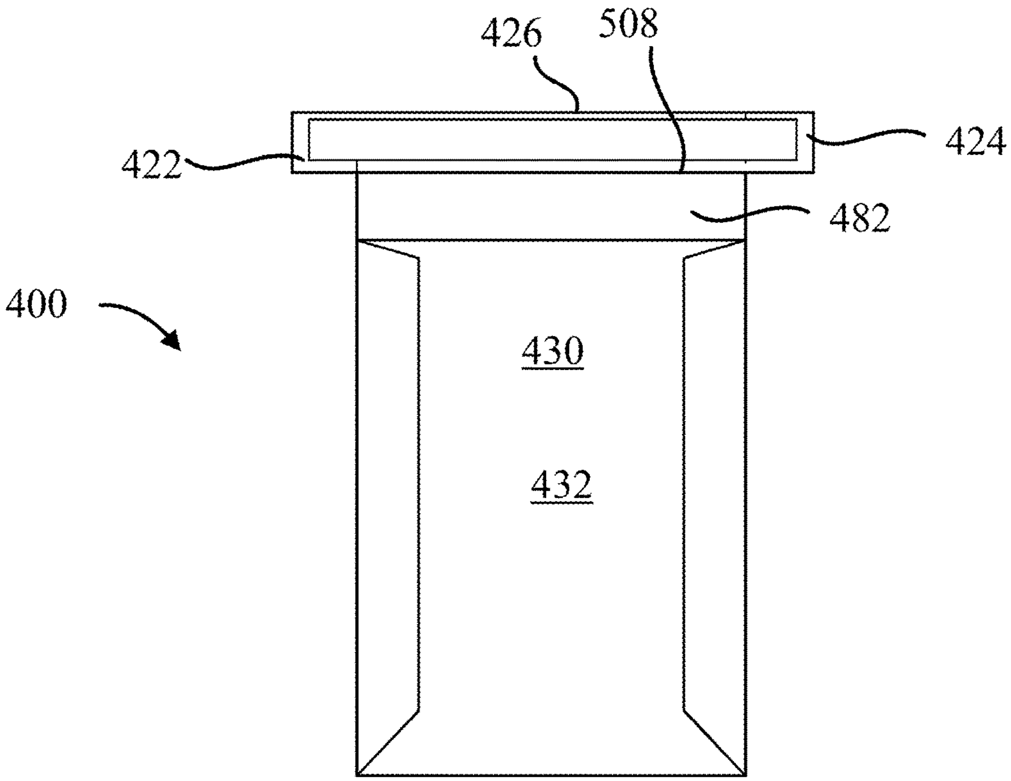
FIG. 5F illustrates the envelope during the assembly process of the envelope, in accordance with various embodiments.

After the internal surface 411 of the front panel 410 mates with the adhesives 463, 465 of the side edge panels 462, 464 and the adhesive 483 of the second top edge panel 482, the outer side edge panels 442, 444 may be folded inward about their respective fold lines (e.g., fold line 506 for outer side edge panel 442 and fold line 507 for outer side edge panel 444) toward the external surface 432 of the back panel 430 as shown in FIGS. 5D-E. In this regard, the adhesive 443 disposed on outer side edge panel 442 and the adhesive 445 on the outer side edge panel 444 engage the external surface 432 of the back panel 430 generating a second side seal for the envelope 400 from FIGS. 4A-C resulting in the envelope 400 of FIG. 5F. Thus, after this step, the sides of the envelope (e.g., the sides with outer side edge panels 442, 444) are double sealed.

Figure 5G:
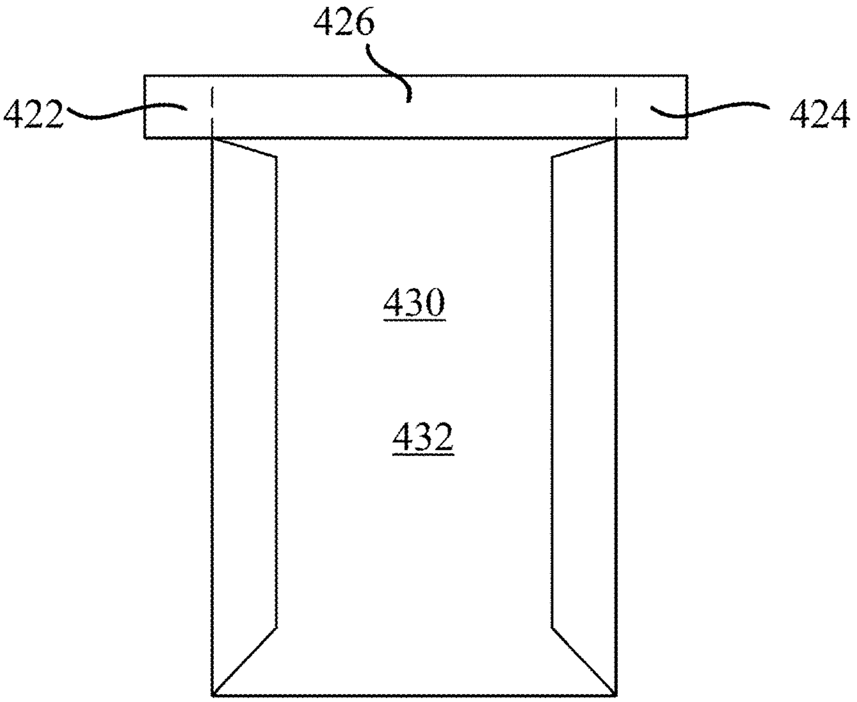
FIG. 5G illustrates the envelope during the assembly process of the envelope, in accordance with various embodiments.
Figure 5H:
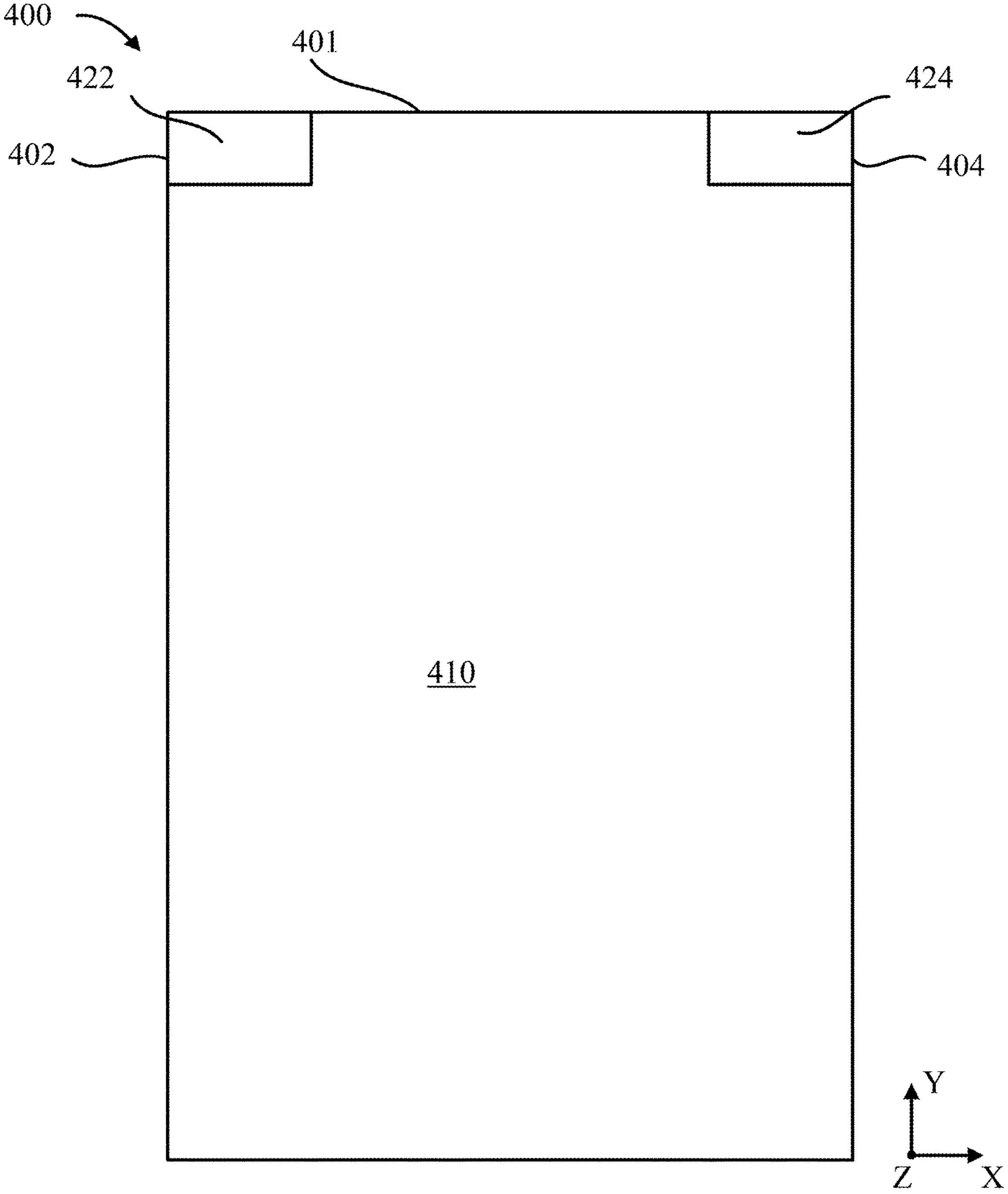
FIG. 5H illustrates the envelope during the assembly process of the envelope, in accordance with various embodiments.

The assembly process further comprises folding the top edge main panel 426 about a fold line 508 toward the second top edge panel 482. In this regard, the adhesive 427 disposed on the top edge main panel 426 mates with the second top edge panel 482 creating a second top edge seal for the cavity 492 of the envelope 400 as shown in FIG. 5G. The assembly process further comprises folding the top edge side panels 422 inward about their respective fold lines (i.e., fold line 509 for top edge side panel 422 and fold line 510 for top edge side panel 424) toward the front panel 410. In this regard, as shown in FIG. 5H, the remaining portion of the adhesive 427 disposed on the top edge side panels 422, 424 mate with the front panel 410 completing the second seal along the sides of the envelope 400.

In various embodiments, the envelopes 200, 400 may be further configured to protect biomaterials (e.g., a blood bag), based on a material construction of at least a portion of panels in the plurality of panels disclosed herein.

Figure 6:
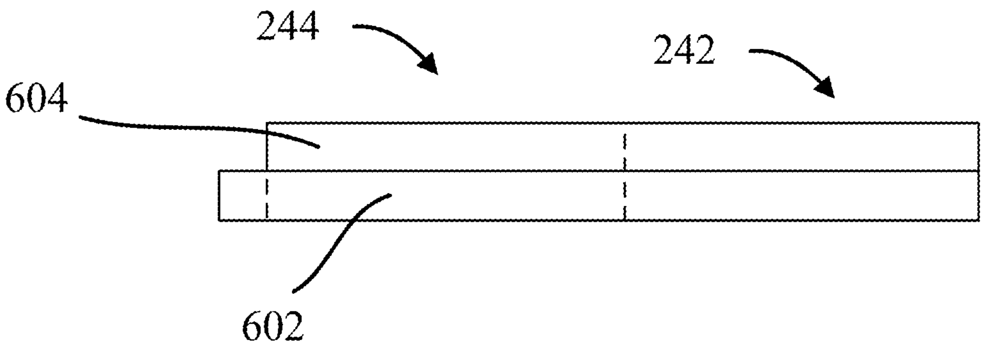
FIG. 6 illustrates the envelope along section line C-C from FIG. 3A, in accordance with various embodiments.

For example, with reference to FIG. 6, a cross-sectional view along section line C-C of envelope 200 from FIG. 3A in a pre-folded state is illustrated in accordance with various embodiments. In various embodiments, the pouch front panel 242 and the pouch back panel 244 of the envelope 200 may each comprise an exterior layer 602 and an absorbent layer 604. In various embodiments, all panels of the envelope 200 may comprise the exterior layer 602 and the absorbent layer 604. In various embodiments, only the pouch front panel 242 and the pouch back panel 244 of the envelope 200 comprise the exterior layer 602 and the absorbent layer 604, and the remaining panels in the plurality of panels of the envelope 200 comprise only the exterior layer 602. The present disclosure is not limited in this regard. By only having the pouch front panel 242 and the pouch back panel 244 of the envelope 200 including the absorbent layer 604, a weight and/or a cost of the envelope may be reduced relative to having the entire envelope made of the exterior layer 602 and the absorbent layer 604. Additionally, the absorbent layer 604 may potentially cause issues with adhesion and limiting a seal if the absorbent layer 604 were applied to each panel in the envelope 200

Similarly, envelope 400 may comprise an exterior layer 602 and an absorbent layer 604 on some panels in the plurality of panels for the envelope 400. For example, with brief reference to FIG. 5A, the back panel 430 and the front panel 400 may each comprise the exterior layer 602 and the absorbent layer 604 as shown in FIG. 7. In this regard. The absorbent layer 604 in envelopes 200, 400 are configured to interface with the biomaterial to be transported (e.g., a blood bag) and provide further protection the biomaterial, in accordance with various embodiments.

In various embodiments, the exterior layer 602 is configured to provide a dimensional-stable print surface. In various embodiments, the exterior layer 602 is configured to protect any ink printed thereon to facilitate assembly. In various embodiments, the external layer 602 is configured as a barrier layer (e.g., with enhanced burst strength and tear resistance). In various embodiments, the external layer 602 provides additional material integrity to the envelopes 200, 400. In various embodiments, the external layer 602 comprises a high-density polyethylene (HDPE) material, such as that sold under the trademark Tyvek® 1073B by Dupont de Numours, Inc. based in Wilmington, Delaware. However, the present disclosure is not limited in this regard. For example, the external layer 602 may comprise any polymeric material and be within the scope of this disclosure.

In various embodiments, the absorbent layer 604 is configured to protect contents being transported (e.g., biomaterials such as a blood bag) from humidity changes. In various embodiments, the absorbent layer 604 is configured for high moisture absorption relative to typical materials. For example, the absorbent layer 604 may comprise an absorbent polymer material capable of absorbing between 25 times and 1,000 times its own weight in water. In various embodiments, the absorbent layer 604 comprises a superabsorbent polymer. The present disclosure is not limited in this regard. In various embodiments, the absorbent layer 604 is configured to provide additional burst strength and/or increase a shelf life of a biomaterial being transferred (e.g., a blood bag).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An envelope for transporting a blood bag, the envelope comprising:
- a plurality of panels configured to transition from a pre-assembled state to an assembled state, wherein in the assembled state, the envelope includes:
  - a front panel in the plurality of panels and a back panel in the plurality of panels, wherein the front panel and the back panel define a cavity in a thickness direction between the front panel and the back panel;
  - a first redundant seal disposed on a first side of the envelope, and
  - a second redundant seal disposed on a second side of the envelope.

2. The envelope of claim 1, wherein the envelope is monolithic.

3. The envelope of claim 1, wherein in the assembled state, a crease is formed on a bottom side of the envelope between the front panel and the back panel.

4. The envelope of claim 1, wherein the cavity is configured to receive the blood bag therein.

5. The envelope of claim 1, wherein in the assembled state, the envelope includes a third redundant seal disposed on a top side of the envelope.

6. The envelope of claim 1, wherein each of a set of panels in the plurality of panels includes an adhesive disposed thereon, the adhesive configured to couple a first panel in the set of panels to a second panel that is not in the set of panels.

7. The envelope of claim 6, wherein the set of panels includes panels that each extend outward from one of the front panel or the back panel.

8. The envelope of claim 1, wherein the envelope is made from a polymeric material.

9. The envelope of claim 1, wherein in the pre-assembled state, the envelope further comprises a plurality of fold lines, the plurality of fold lines configured to guide the transition from the pre-assembled state to the assembled state.

10. A method of forming an envelope for transporting a blood bag, the method comprising:
- folding a plurality of panels, the plurality of panels including at least a front panel and a back panel,
- mating a first set of panels in the plurality of panels to a second set of panels in the plurality of panels; and
- in response to the mating, forming a cavity defined in a thickness direction between the front panel and the back panel, the cavity configured to receive the blood bag therein, the mating forming a first redundant seal on a first side of the envelope and a second redundant seal on a second side of the envelope.

11. The method of claim 10, further comprising disposing the blood bag in the cavity.

12. The method of claim 11, further comprising folding a remaining set of panels in the plurality of panels to form a third redundant seal on a top side of the envelope.

13. The method of claim 10, wherein in response to folding the plurality of panels, a crease is formed on a bottom side of the envelope.

14. The method of claim 10, further comprising:

disposing the blood bag in the cavity; and folding a remaining set of panels to form an assembled state of the envelope.

15. A method of transporting a plurality of blood bags, the method comprising:

folding an envelope in a pre-assembled state to an assembled state;

disposing a blood bag in the envelope one of prior to the folding or at an intermediate step during the folding;

disposing the envelope in a carrying bag; and transporting the carrying bag from a first location to a second location.

16. The method of claim 15, further comprising disposing a plurality of envelopes in the assembled state in the carrying bag, each of the plurality of envelopes in the assembled state including a respective blood bag in the plurality of blood bags, the plurality of envelopes including the envelope.

17. The method of claim 16, further comprising disposing an absorbent material layer between each of the plurality of envelopes in the assembled state.

18. The method of claim 15, wherein in the assembled state, the envelope includes a cavity defined in a thickness direction between a front panel and a back panel of the envelope, the blood bag disposed in the cavity.

19. The method of claim 15, wherein the envelope includes a polymeric material.

20. The method of claim 19, wherein the folding the envelope in the pre-=assembled state to the assembled state further includes:

folding a plurality of panels, the plurality of panels including at least a front panel and a back panel, and mating a first set of panels in the plurality of panels to a second set of panels in the plurality of panels to form a cavity configured to receive the blood bag.

* * * * *